(12) United States Patent
Nachimuthu et al.

(10) Patent No.: US 11,307,787 B2
(45) Date of Patent: Apr. 19, 2022

(54) TECHNOLOGIES FOR PROVIDING MANIFEST-BASED ASSET REPRESENTATION

(71) Applicant: Intel Corporation, Santa Clara, CA (US)

(72) Inventors: Murugasamy K. Nachimuthu, Beaverton, OR (US); Mohan J. Kumar, Aloha, OR (US); Alberto J. Munoz, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 356 days.

(21) Appl. No.: 15/826,051

(22) Filed: Nov. 29, 2017

(65) Prior Publication Data

US 2018/0150372 A1    May 31, 2018

Related U.S. Application Data

(60) Provisional application No. 62/584,401, filed on Nov. 10, 2017, provisional application No. 62/427,268, filed on Nov. 29, 2016.

(30) Foreign Application Priority Data

Aug. 30, 2017    (IN) .............................. 201741030632

(51) Int. Cl.
*G06F 15/173* (2006.01)
*G06F 3/06* (2006.01)
(Continued)

(52) U.S. Cl.
CPC .......... *G06F 3/0641* (2013.01); *G06F 3/0604* (2013.01); *G06F 3/065* (2013.01);
(Continued)

(58) Field of Classification Search
CPC .. G06F 3/0641; G06F 9/5005; G06F 11/3079; G06F 16/1744; G06F 8/65;
(Continued)

(56) References Cited

U.S. PATENT DOCUMENTS 9,250,956 B2 * 2/2016 Munshi ..................... G06F 8/41
9,378,461 B1 * 6/2016 Chatterjee ............. G06F 9/5005
(Continued)

OTHER PUBLICATIONS

"GEN Z Core Specification" (Draft), GEN-Z Consortium, Dec. 2016, 764 pages.

*Primary Examiner* — Anh Nguyen
(74) *Attorney, Agent, or Firm* — Compass IP Law PC

(57) ABSTRACT

Technologies for generating manifest data for a sled include a sled to generate manifest data indicative of one or more characteristics of the sled (e.g., hardware resources, firmware resources, a configuration of the sled, or a health of sled components). The sled is also to associate an identifier with the manifest data. The identifier uniquely identifies the sled from other sleds. Additionally, the sled is to send the manifest data and the associated identifier to a server. The sled may also detect a change in the hardware resources, firmware resources, the configuration, or component health of the sled. The sled may also generate an update of the manifest data based on the detected change, where the update specifies the detected change in the hardware resources, firmware resources, the configuration, or component health of the sled. The sled may also send the update of the manifest data to the server.

24 Claims, 21 Drawing Sheets

(51) Int. Cl.

| | |
|---|---|
| G06F 16/174 | (2019.01) |
| G06F 21/57 | (2013.01) |
| G06F 21/73 | (2013.01) |
| G06F 8/65 | (2018.01) |
| H04L 41/0816 | (2022.01) |
| H04L 41/0853 | (2022.01) |
| H04L 41/12 | (2022.01) |
| H04L 67/10 | (2022.01) |
| G06F 11/30 | (2006.01) |
| G06F 9/50 | (2006.01) |
| H01R 13/453 | (2006.01) |
| G06F 9/48 | (2006.01) |
| G06F 9/455 | (2018.01) |
| H03M 7/30 | (2006.01) |
| H03M 7/40 | (2006.01) |
| H04L 43/08 | (2022.01) |
| H04L 47/20 | (2022.01) |
| H04L 47/2441 | (2022.01) |
| G06F 11/07 | (2006.01) |
| G06F 11/34 | (2006.01) |
| G06F 7/06 | (2006.01) |
| G06T 9/00 | (2006.01) |
| H03M 7/42 | (2006.01) |
| H04L 12/28 | (2006.01) |
| H04L 12/46 | (2006.01) |
| H04L 61/5007 | (2022.01) |
| G06F 13/16 | (2006.01) |
| G06F 21/62 | (2013.01) |
| G06F 21/76 | (2013.01) |
| H03K 19/173 | (2006.01) |
| H04L 9/08 | (2006.01) |
| H04L 41/044 | (2022.01) |
| H04L 49/104 | (2022.01) |
| H04L 67/63 | (2022.01) |
| H04L 67/75 | (2022.01) |
| H04L 43/04 | (2022.01) |
| H04L 43/06 | (2022.01) |
| H04L 43/0894 | (2022.01) |
| G06F 9/38 | (2018.01) |
| G06F 12/02 | (2006.01) |
| G06F 12/06 | (2006.01) |
| G06T 1/20 | (2006.01) |
| G06T 1/60 | (2006.01) |
| G06F 9/54 | (2006.01) |
| H04L 67/1014 | (2022.01) |
| G06F 8/656 | (2018.01) |
| G06F 8/658 | (2018.01) |
| G06F 8/654 | (2018.01) |
| G06F 9/4401 | (2018.01) |
| H01R 13/631 | (2006.01) |
| H05K 7/14 | (2006.01) |
| H04L 47/78 | (2022.01) |
| G06F 11/14 | (2006.01) |
| H04L 41/046 | (2022.01) |
| H04L 41/0896 | (2022.01) |
| H04L 41/142 | (2022.01) |
| H04L 29/06 | (2006.01) |
| G06F 15/80 | (2006.01) |

(52) U.S. Cl.
CPC ............ *G06F 3/067* (2013.01); *G06F 3/0608* (2013.01); *G06F 3/0611* (2013.01); *G06F 3/0613* (2013.01); *G06F 3/0617* (2013.01); *G06F 3/0647* (2013.01); *G06F 3/0653* (2013.01); *G06F 7/06* (2013.01); *G06F 8/65* (2013.01); *G06F 8/654* (2018.02); *G06F 8/656* (2018.02); *G06F 8/658* (2018.02); *G06F 9/3851* (2013.01); *G06F 9/3891* (2013.01); *G06F 9/4401* (2013.01); *G06F 9/45533* (2013.01); *G06F 9/4843* (2013.01); *G06F 9/4881* (2013.01); *G06F 9/5005* (2013.01); *G06F 9/505* (2013.01); *G06F 9/5038* (2013.01); *G06F 9/5044* (2013.01); *G06F 9/5083* (2013.01); *G06F 9/544* (2013.01); *G06F 11/0709* (2013.01); *G06F 11/079* (2013.01); *G06F 11/0751* (2013.01); *G06F 11/3006* (2013.01); *G06F 11/3034* (2013.01); *G06F 11/3055* (2013.01); *G06F 11/3079* (2013.01); *G06F 11/3409* (2013.01); *G06F 12/0284* (2013.01); *G06F 12/0692* (2013.01); *G06F 13/1652* (2013.01); *G06F 16/1744* (2019.01); *G06F 21/57* (2013.01); *G06F 21/6218* (2013.01); *G06F 21/73* (2013.01); *G06F 21/76* (2013.01); *G06T 1/20* (2013.01); *G06T 1/60* (2013.01); *G06T 9/005* (2013.01); *H01R 13/453* (2013.01); *H01R 13/4536* (2013.01); *H01R 13/4538* (2013.01); *H01R 13/631* (2013.01); *H03K 19/1731* (2013.01); *H03M 7/3084* (2013.01); *H03M 7/40* (2013.01); *H03M 7/42* (2013.01); *H03M 7/60* (2013.01); *H03M 7/6011* (2013.01); *H03M 7/6017* (2013.01); *H03M 7/6029* (2013.01); *H04L 9/0822* (2013.01); *H04L 12/2881* (2013.01); *H04L 12/4633* (2013.01); *H04L 41/044* (2013.01); *H04L 41/0816* (2013.01); *H04L 41/0853* (2013.01); *H04L 41/12* (2013.01); *H04L 43/04* (2013.01); *H04L 43/06* (2013.01); *H04L 43/08* (2013.01); *H04L 43/0894* (2013.01); *H04L 47/20* (2013.01); *H04L 47/2441* (2013.01); *H04L 49/104* (2013.01); *H04L 61/2007* (2013.01); *H04L 67/10* (2013.01); *H04L 67/1014* (2013.01); *H04L 67/327* (2013.01); *H04L 67/36* (2013.01); *H05K 7/1452* (2013.01); *H05K 7/1487* (2013.01); *G06F 11/1453* (2013.01); *G06F 12/023* (2013.01); *G06F 15/80* (2013.01); *G06F 2212/401* (2013.01); *G06F 2212/402* (2013.01); *G06F 2221/2107* (2013.01); *H04L 41/046* (2013.01); *H04L 41/0896* (2013.01); *H04L 41/142* (2013.01); *H04L 47/78* (2013.01); *H04L 63/1425* (2013.01)

(58) Field of Classification Search
CPC ...... G06F 21/73; G06F 21/57; G06F 11/3055; G06F 11/3034; G06F 3/0604; G06F 9/4401; G06F 8/654; G06F 8/658; G06F 8/656; G06F 9/544; G06F 9/5038; G06F 9/3891; G06F 12/0692; G06F 12/0284; G06F 9/505; G06F 9/4881; G06F 9/3851; G06F 21/76; G06F 21/6218; G06F 13/1652; G06F 7/06; G06F 11/3409; G06F 11/3006; G06F 11/079; G06F 11/0751; G06F 11/0709; G06F 3/0653; G06F 3/0647; G06F 3/0617; G06F 3/0613; G06F 3/0611; G06F 3/067; G06F 3/065; G06F 3/0608; G06F 15/80; G06F 2221/2107; G06F 2212/402; G06F 2212/401; G06F 12/023; G06F 11/1453; H04L 67/10; H04L 41/12; H04L 41/0853; H04L 41/0816; H04L 67/1014; H04L 43/0894; H04L 43/06; H04L 43/04; H04L
67/36; H04L 67/327; H04L 49/104; H04L
41/044; H04L 9/0822; H04L 61/2007;
H04L 12/4633; H04L 12/2881; H04L
47/2441; H04L 47/20; H04L 43/08; H04L
47/78; H04L 63/1425; H04L 41/142;
H04L 41/0896; H04L 41/046; H05K
7/1487; H05K 7/1452; H01R 13/631;
H01R 13/4538; G06T 1/60; G06T 1/20;
G06T 9/005; H03K 19/1731; H03M 7/42;
H03M 7/3084; H03M 7/6029; H03M
7/6011; H03M 7/40; H03M 7/60; H03M
7/6017

See application file for complete search history.

(56) References Cited

U.S. PATENT DOCUMENTS

| | | | | |
|---|---|---|---|---|
| 2013/0125107 | A1* | 5/2013 | Bandakka | G06F 11/1448 717/171 |
| 2016/0356639 | A1* | 12/2016 | Chou | H04Q 1/09 |
| 2017/0235613 | A1* | 8/2017 | Smola | G06F 9/5083 718/1 |
| 2017/0286087 | A1* | 10/2017 | Naota | H04N 1/0097 |

* cited by examiner

TECHNOLOGIES FOR PROVIDING MANIFEST-BASED ASSET REPRESENTATION

CROSS-REFERENCE TO RELATED APPLICATIONS

The present application claims the benefit of U.S. Provisional Patent Application No. 62/427,268, filed Nov. 29, 2016, Indian Provisional Patent Application No. 201741030632, filed Aug. 30, 2017, U.S. Provisional Patent Application No. 62/584,401, filed Nov. 10, 2017, and U.S. Provisional Patent Application No. 62/584,401, filed Nov. 10, 2017.

BACKGROUND

In systems that distribute workloads among multiple compute devices (e.g., in a data center), a centralized server may compose nodes of compute devices to process the workloads. Each node represents a logical aggregation of resources (e.g., compute, storage, acceleration, and the like) provided by each compute device. Based on the resource requirements of the workload, the centralized server determines a composition of compute devices that satisfies such requirements. For instance, for compute-intensive workloads, the centralized server may include, in the node, a compute device that has a relatively large processor count, wherein each processor exceeds a given core frequency. Typically, prior to composing a node, the centralized server performs an asset discovery process on the compute devices in the system to determine resources provided by each compute device. During the asset discovery process, the centralized server queries a given compute device and receives information about the resources on that device. The centralized system may then evaluate the information to determine which compute devices satisfy resource requirements for a given workload.

Further, the centralized server composes nodes in a variety of situations after initial configuration of the system. For example, following an outage, the centralized server must bring nodes back online. However, doing so requires the centralized server to again conduct the asset discovery process to determine which resources are present in each compute device. Given that a system can potentially include as many as thousands of compute devices, querying each compute device consumes considerable network utilization and also creates a bottleneck in restoring the composed nodes. As another example, resources may be added to, removed from, or become inoperative in a given compute device. The centralized server might not detect the change in resources until conducting another asset discovery process.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
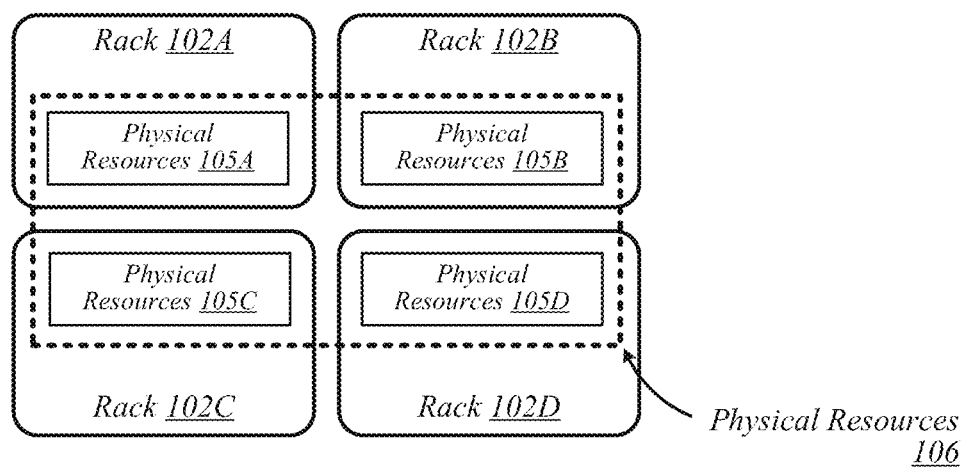
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 10Q includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
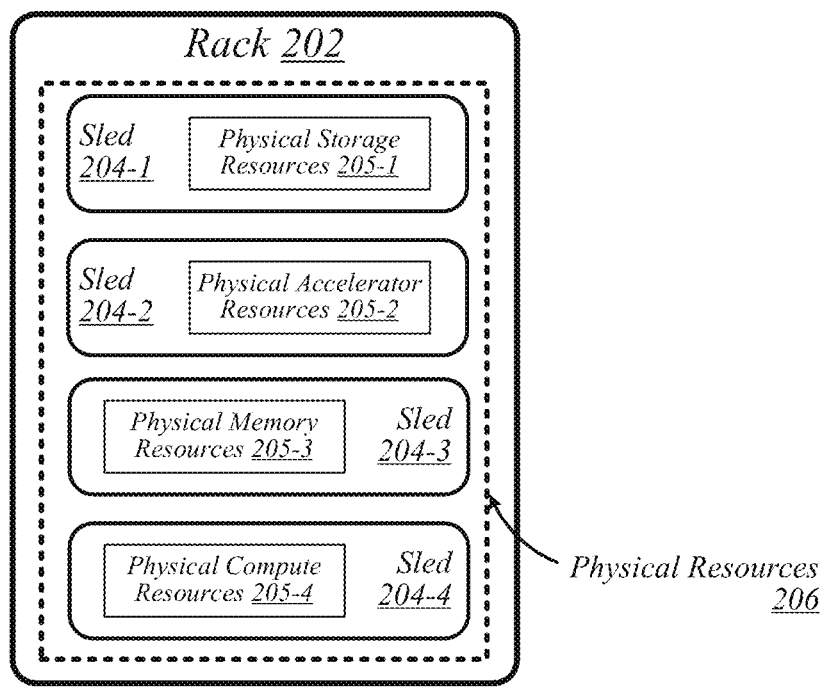
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-4 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
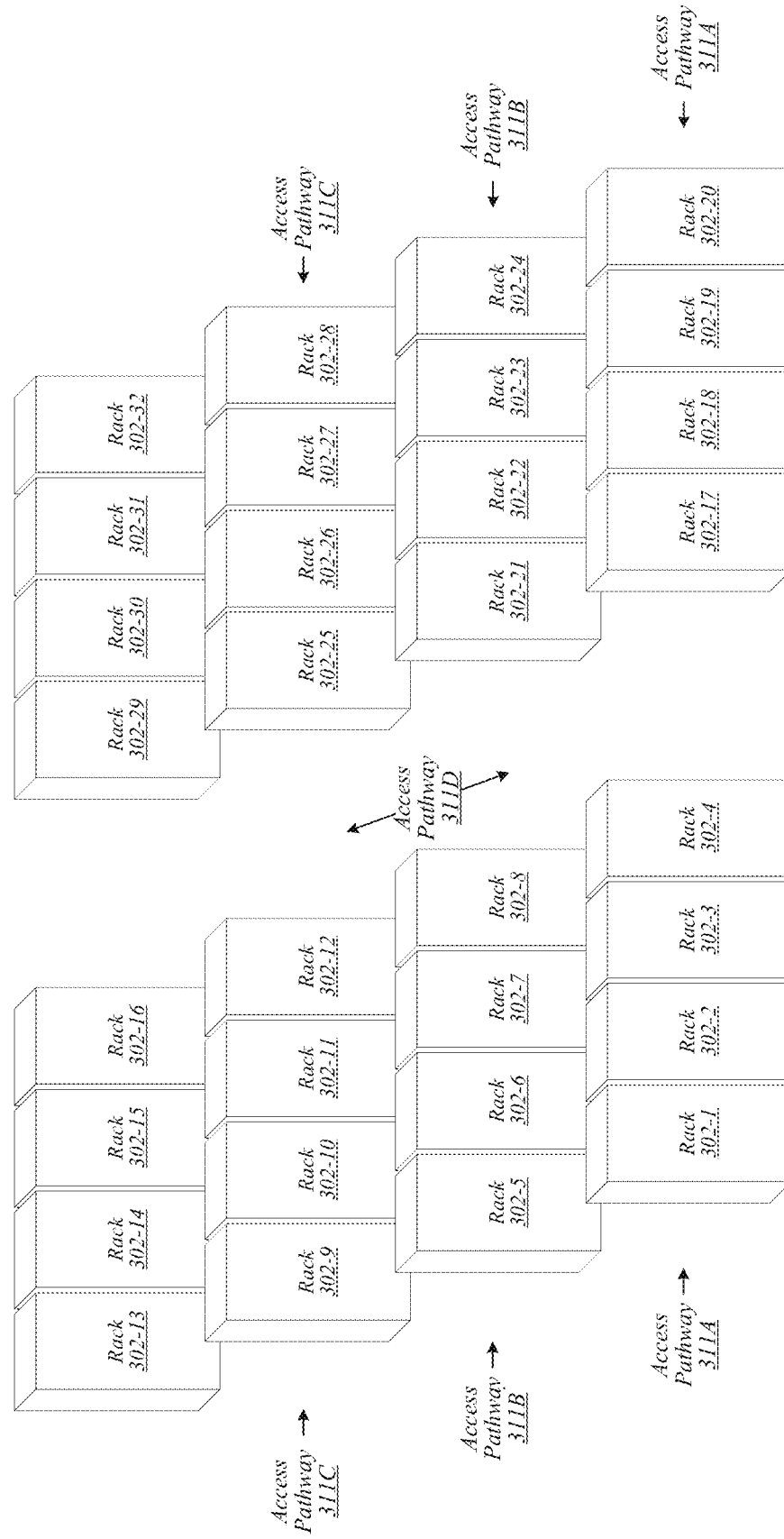
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
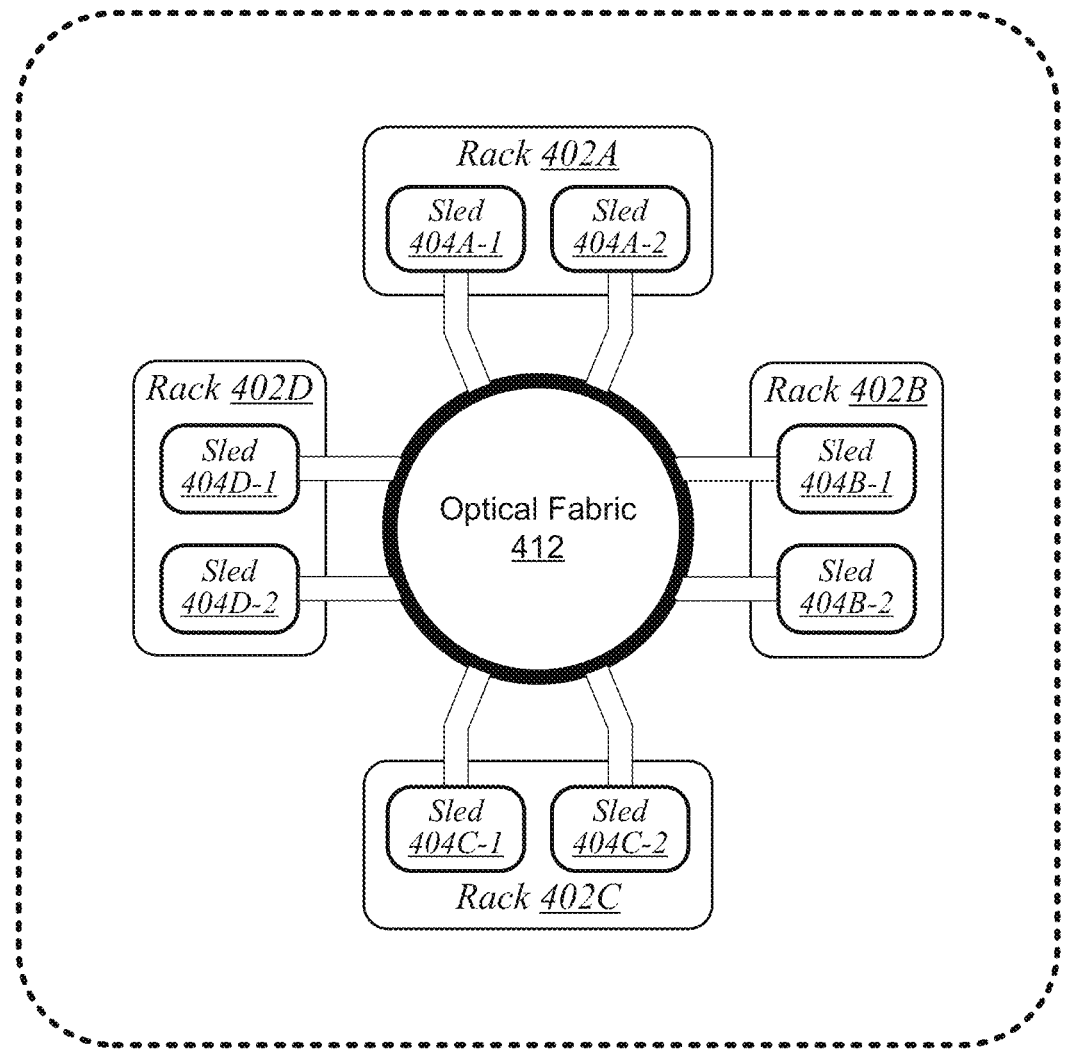
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
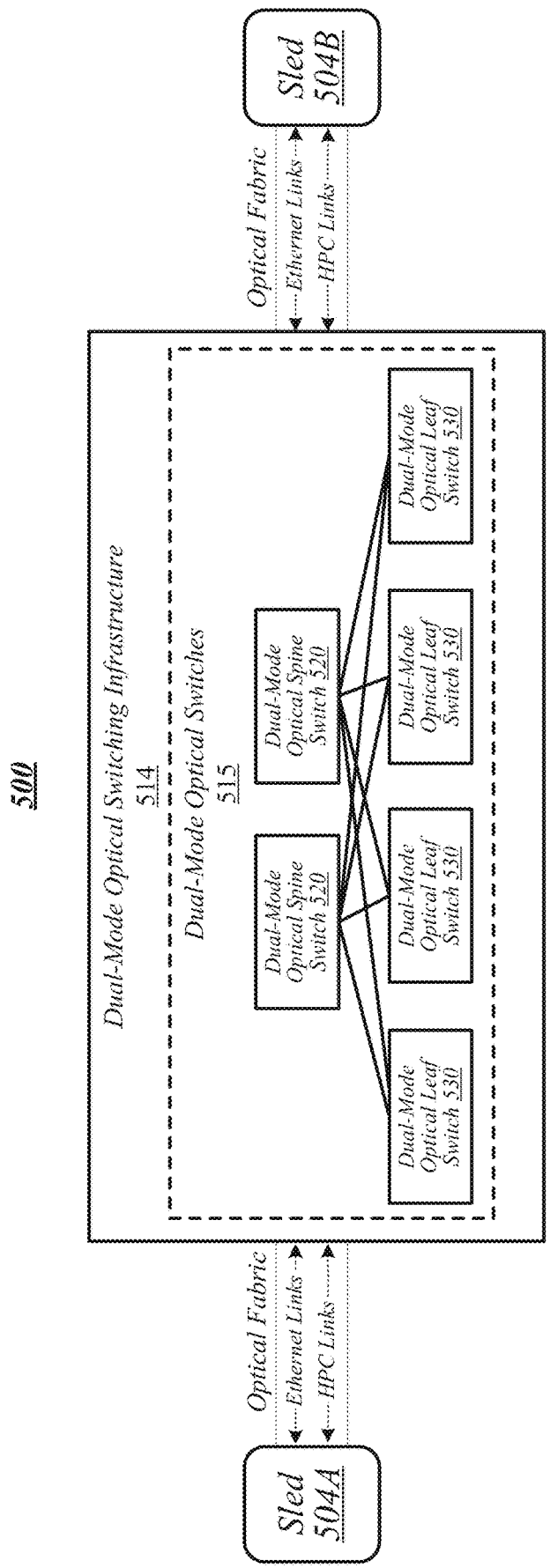
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, InfiniBand™) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
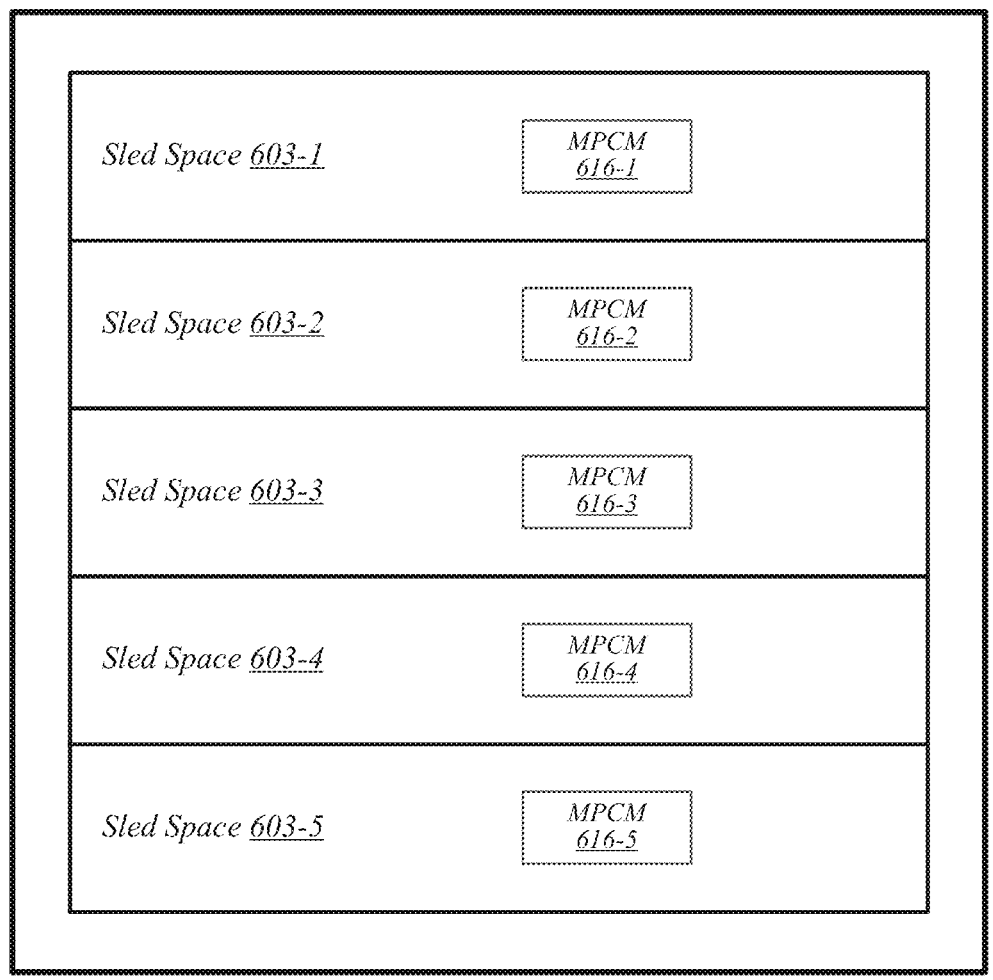
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
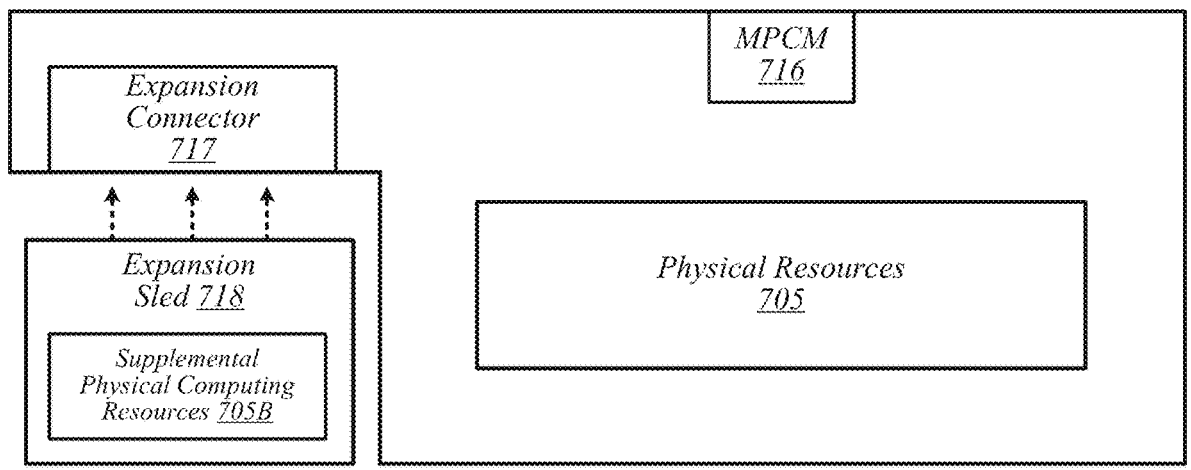
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
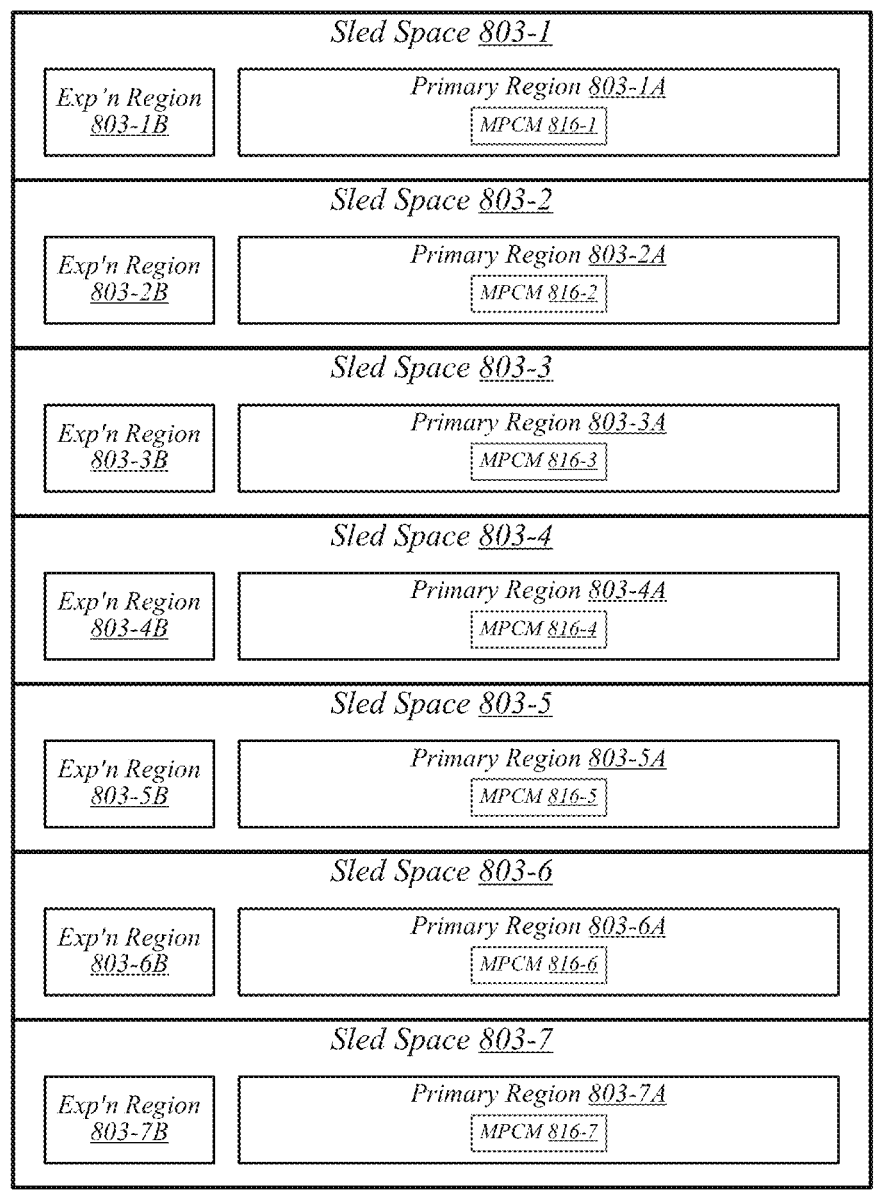
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
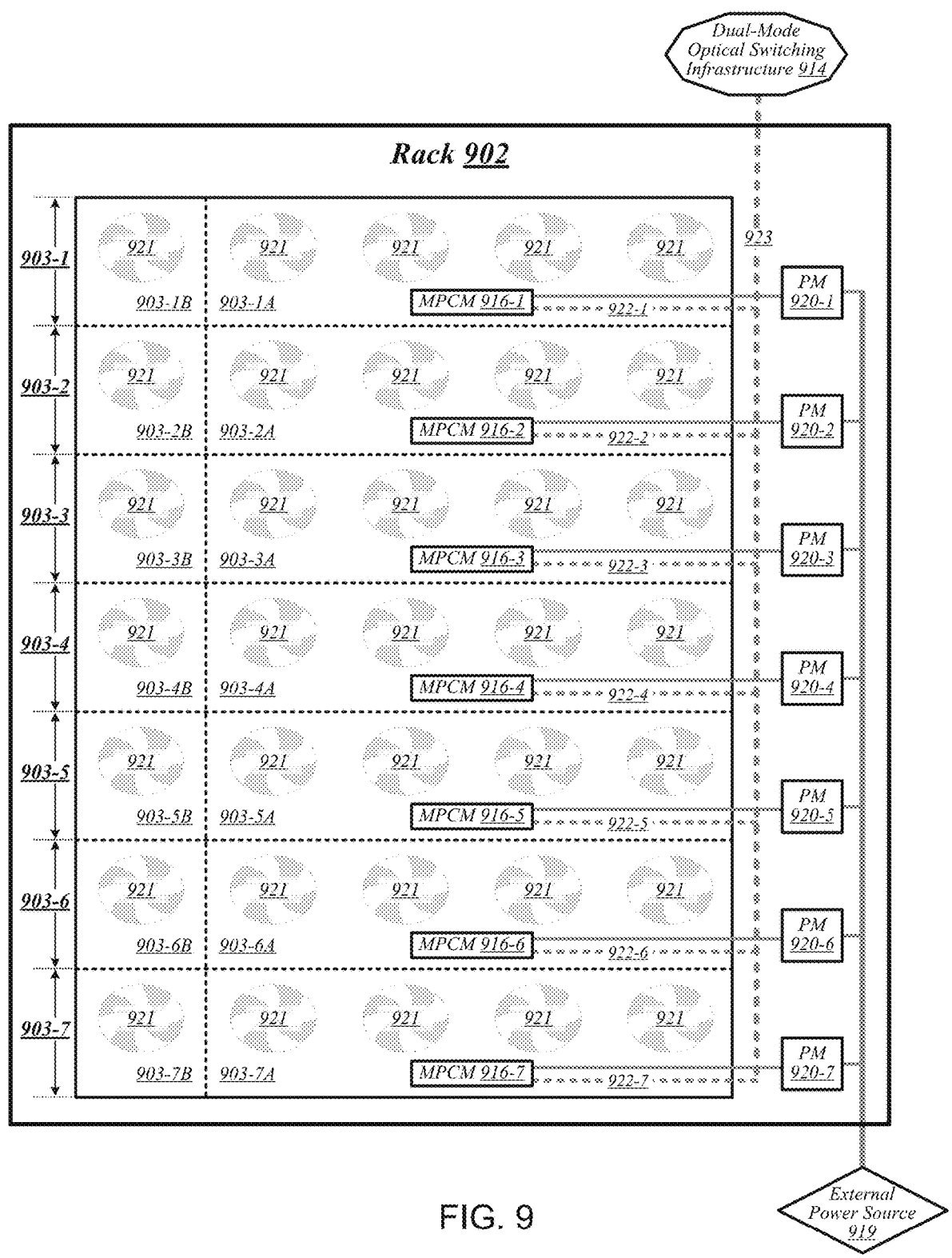
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 921 that are generally arranged to provide air cooling within the various sled spaces 903-1 to 903-7. In some embodiments, the height of the sled space is greater than the conventional "1 U" server height. In such embodiments, fans 921 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 919. In various embodiments, external power source 919 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
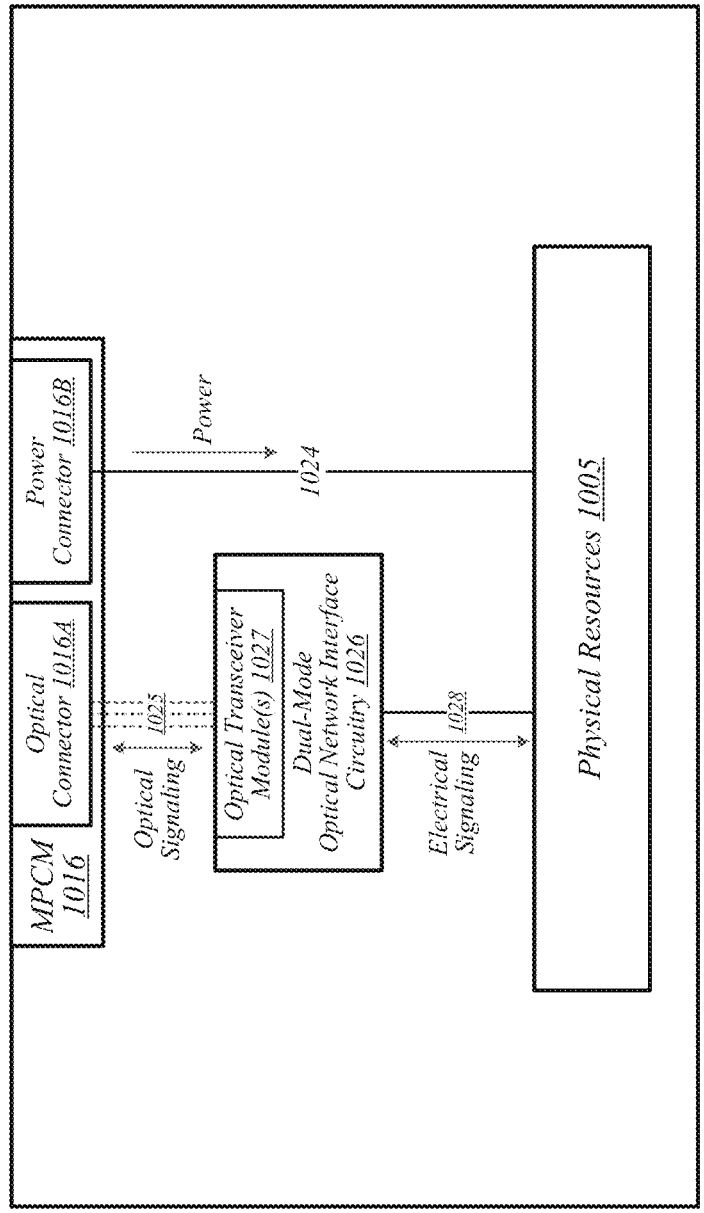
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 101613, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
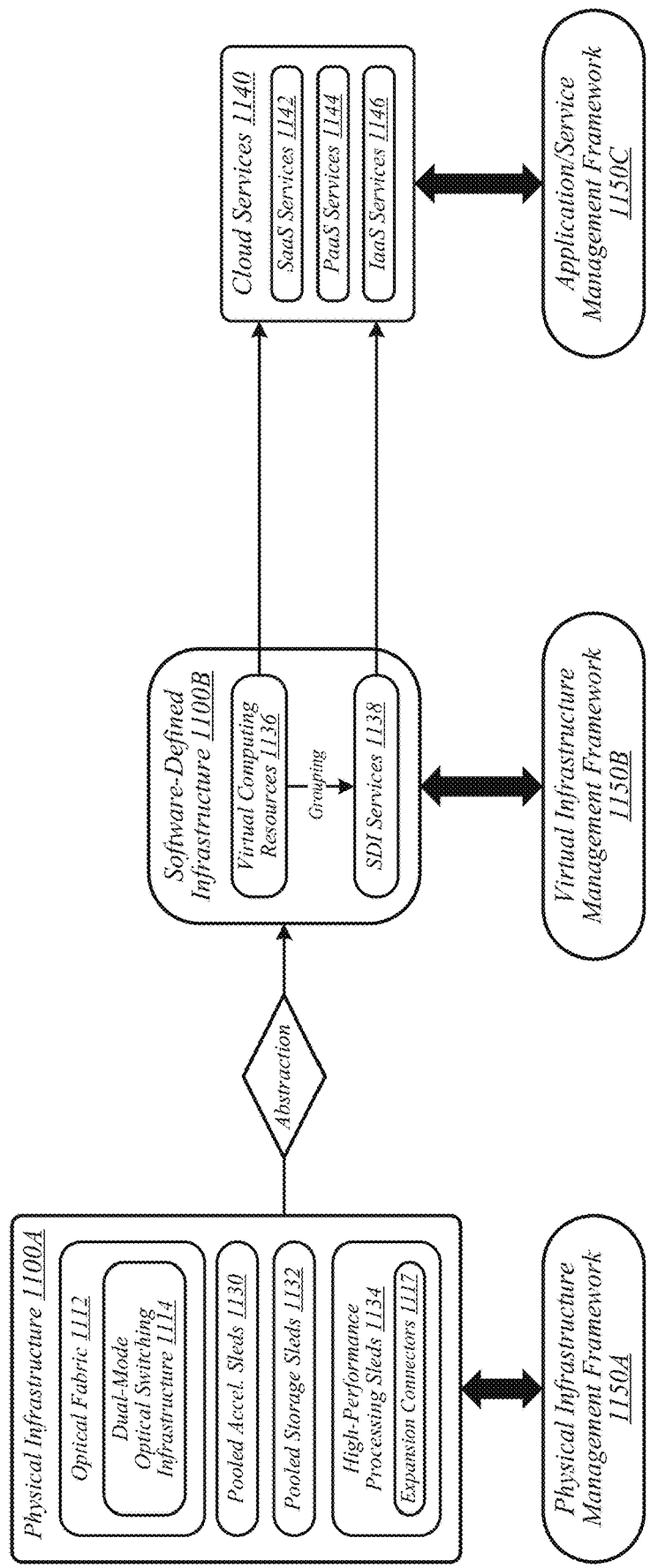
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to— optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of software-defined infrastructure (SDI) services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
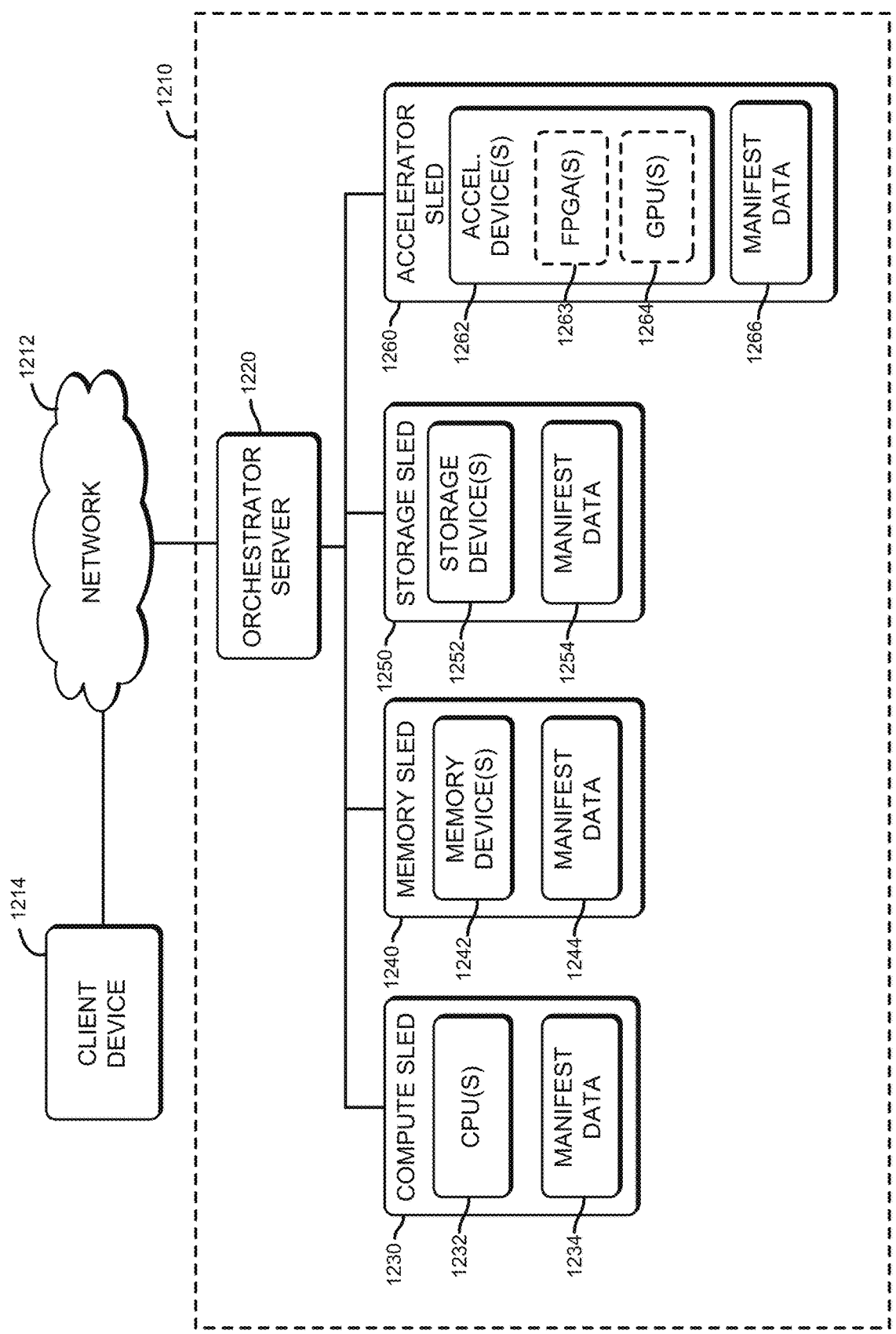
FIG. 12 is a simplified block diagram of at least one embodiment of a system for providing a manifest indicative of resources of a sled.

Referring now to FIG. 12, a system 1210 for providing a manifest indicative of resources of a sled (e.g., the compute sled 1230, the memory sled 1240, the storage sled 1250, the accelerator sled 1260) may be implemented in accordance with the data centers 100, 300, 400, and 1100 described above with references to FIGS. 1, 3, 4, and 11. In an example embodiment, the system 1210 includes an orchestrator server 1220 communicatively coupled with multiple sleds, including a compute sled 1230, a memory sled 1240, a storage sled 1250, and an accelerator sled 1260.

One or more of the sleds 1230, 1240, 1250, or 1260 may be grouped into a managed node, such as by the orchestrator server 1220, to collectively perform a workload, such as an application. A managed node may be embodied as an assembly of resources (e.g., physical resources 206), such as compute resources (e.g., physical compute resources 205-4), memory resources (e.g., physical memory resources 205-3), storage resources (e.g., physical storage resources 205-1), or other resources (e.g., physical accelerator resources 205-2), from the same or different sleds (e.g., the sleds 204-1, 204-2, 204-3, 204-4, etc.) or racks (e.g., one or more of racks 302-1 through 302-32). Further, a managed node may be established, defined, or "spun up" by the orchestrator server 1220 at the time a workload is to be assigned to the managed node or at any other time, and may exist regardless of whether any workloads are presently assigned to the managed node. The system 1210 may be located in a data center and provide storage and compute services (e.g., cloud services) to a client device 1214 that is in communication with the system 1210 through a network 1212 (e.g., the Internet). The orchestrator server 1220 may support a cloud operating environment, such as OpenStack, and managed nodes established by the orchestrator server 1220 may execute one or more applications or processes (i.e., workloads), such as in virtual machines or containers, on behalf of a user of the client device 1214.

Illustratively, the compute sled 1230 includes one or more central processing units (CPUs) 1232 (e.g., a processor or other device or circuitry capable of performing a series of operations) that executes a workload (e.g., an application). The memory sled 1240 includes one or more memory devices 1242 (e.g., non-volatile memory such as byte-addressable write in-place non-volatile memory, volatile memory such as DRAM, etc.). The storage sled 1250 includes one or more storage devices 1252 (e.g., hard disk drives (HDDs), solid state drives (SSDs), etc.), and the accelerator sled 1260 includes one or more accelerator devices 1262, which may be embodied as any device or circuitry for accelerating the execution of one or more operations. In the illustrative embodiment, the accelerator devices 1262 include field-programmable gate arrays (FPGAs) 1263 and graphical processing units (GPUs) 1264.

To determine resources provided by each of the sleds 1230, 1240, 1250, and 1260, the orchestrator server 1220 may perform asset discovery on each sled of the system 1210. The illustrative asset discovery includes querying each sled for a description of resources present and configured in the sled, and the sled returns such description in response. Doing so allows the orchestrator server 1220 to determine a suitable configuration of sleds to compose a node. As stated, the orchestrator server 1220 may compose nodes from one or more of the sleds 1230, 1240, 1250, and 1260 to perform a workload. Each node may include resources to efficiently meet requirements of the workload. For example, the orchestrator server 1220 may compose a node that includes multiple storage sleds to pool a relatively large amount of storage capacity to process workloads requiring such capacity. As another example, the orchestrator server 1220 may compose a node that includes compute sleds with a relatively large core frequency to process compute-intensive workloads.

As will be further described below, the orchestrator server 1220 may determine resources provided by the sleds based on manifest data generated by each sled. More particularly, each of the compute sled 1230, memory sled 1240, storage sled 1250, and accelerator sled 1260 generates manifest data 1234, 1244, 1254, and 1266, respectively. The manifest data provides a record indicative of the resources and configuration present on the corresponding sled. The manifest data may also include a record indicative of health of hardware resources in the sled, such as of hardware devices present in the sled. Further, each of the manifest data may be associated with a corresponding sled using an identifier that uniquely identifies the sled from other sleds in the system 1210, such as a universally unique identifier (UUID) (e.g., a 128-bit number produced as a function of a network address of the sled, a timestamp of when the UUID was produced, a randomly generated number, a cryptographic identifier, etc.). The identifier allows the orchestrator server 1220 to retrieve manifest data from a sled and locally store the manifest data by the UUID. As a result, in situations in which the orchestrator server 1220 subsequently requires resource information for a given sled, the orchestrator server 1220 may evaluate locally stored manifest rather than querying the sled. Further still, a sled may send updates to the manifest data using the associated UUID to the orchestrator server 1220 (e.g., in the event that resources are added to or removed from the sled). Doing so ensures that the orchestrator server 1220 has a most recent record of the resources available in the sled.

Figure 13:
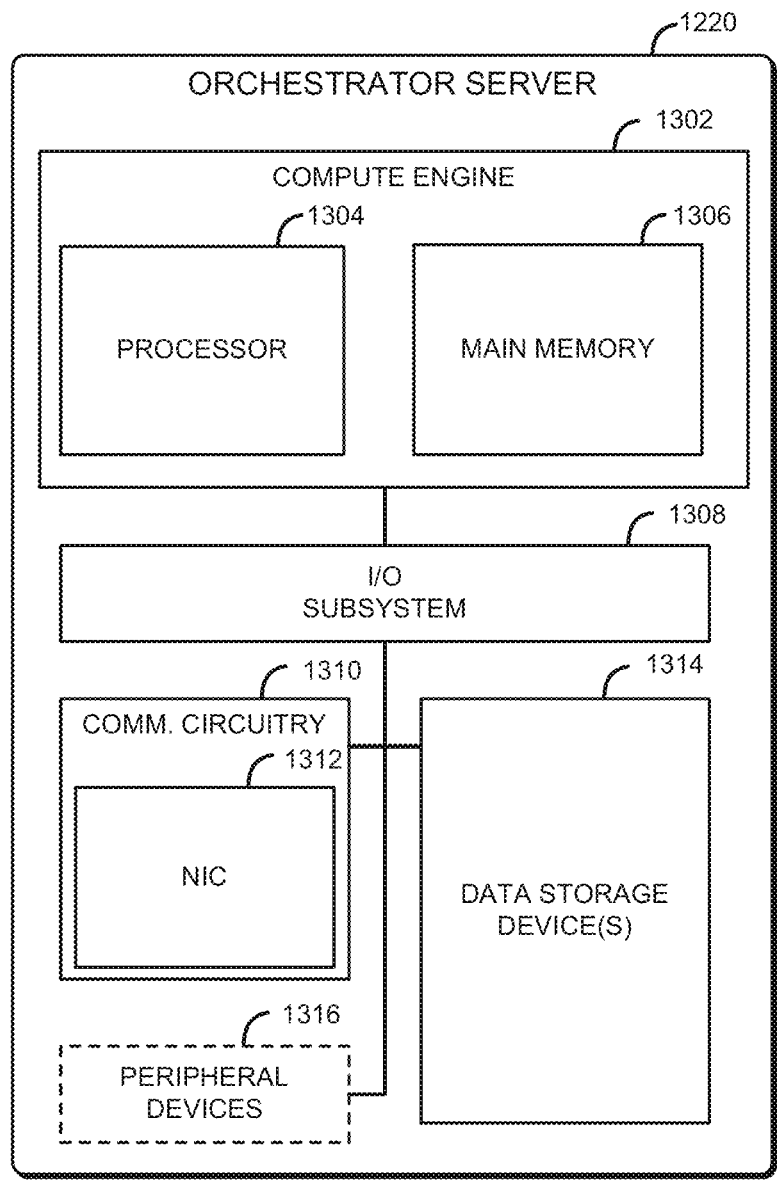
FIG. 13 is a simplified block diagram of at least one embodiment of the orchestrator server of the system of FIG. 12.

Referring now to FIG. 13, the orchestrator server 1220 may be embodied as any type of compute device capable of performing the functions described herein, including receiving a request to compose a node of one or more sleds to process a workload, determining resource requirements of the workload, determining a configuration of sleds that satisfies the resource requirements based on manifest data, and composing the node based on the determined configuration of sleds.

As shown in FIG. 13, the illustrative orchestrator server 1220 includes a compute engine 1302, an input/output (I/O) subsystem 1308, communication circuitry 1310, and one or more data storage devices 1314. Of course, in other embodiments, the orchestrator server 1220 may include other or additional components, such as those commonly found in a computer (e.g., display, peripheral devices, etc.). Additionally, in some embodiments, one or more of the illustrative components may be incorporated in, or otherwise form a portion of, another component.

The compute engine 1302 may be embodied as any type of device or collection of devices capable of performing various compute functions described below. In some embodiments, the compute engine 1302 may be embodied as a single device such as an integrated circuit, an embedded system, a field-programmable gate array (FPGA), a system-on-a-chip (SOC), or other integrated system or device. Additionally, in some embodiments, the compute engine 1302 includes or is embodied as a processor 1304 and a memory 1306. The processor 1304 may be embodied as any type of processor capable of performing the functions described herein. For example, the processor 1304 may be embodied as a single or multi-core processor(s), a microcontroller, or other processor or processing/controlling circuit. In some embodiments, the processor 1304 may be embodied as, include, or be coupled to an FPGA, an application specific integrated circuit (ASIC), reconfigurable hardware or hardware circuitry, or other specialized hardware to facilitate performance of the functions described herein.

The main memory 1306 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 1306 may be integrated into the processor 1304. In operation, the main memory 1306 may store various software and data used during operation such as manifest data of sleds in the system 1210.

The compute engine 1302 is communicatively coupled with other components of the compute sled 1230, memory sled 1240, storage sled 1250, and accelerator sled 1260 via the I/O subsystem 1308, which may be embodied as circuitry and/or components to facilitate input/output operations with the compute engine 1302 (e.g., with the processor 1304 and/or the main memory 1306) and other components of the orchestrator server 1220. For example, the I/O subsystem 1308 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1308 may form a portion of a system-on-a-chip (SoC) and be incorporated, along with one or more of the processor 1304, the main memory 1306, and other components of the orchestrator server 1220, into the compute engine 1302.

The communication circuitry 1310 may be embodied as any communication circuit, device, or collection thereof, capable of enabling communications over the network 1212 between the orchestrator server 1220 and another compute device (e.g., the compute sled 1230, the accelerator sleds 1240, 1242, etc.). The communication circuitry 1310 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1310 includes a network interface controller (NIC) 1312, which may also be referred to as a host fabric interface (HFI). The NIC 1312 may be embodied as one or more add-in-boards, daughter cards, network interface cards, controller chips, chipsets, or other devices that may be used by the orchestrator server 1220 to connect with another compute device (e.g., the compute sled 1230, the memory sled 1240, the storage sled 1250, the accelerator sled 1260, etc.). In some embodiments, the NIC 1312 may be embodied as part of a system-on-a-chip (SoC) that includes one or more processors, or included on a multichip package that also contains one or more processors. In some embodiments, the NIC 1312 may include a local processor (not shown) and/or a local memory (not shown) that are both local to the NIC 1312. In such embodiments, the local processor of the NIC 1312 may be capable of performing one or more of the functions of the compute engine 1302 described herein. Additionally or alternatively, in such embodiments, the local memory of the NIC 1312 may be integrated into one or more components of the orchestrator server 1220 at the board level, socket level, chip level, and/or other levels.

The one or more illustrative data storage devices 1314, may be embodied as any type of devices configured for short-term or long-term storage of data such as, for example, memory devices and circuits, memory cards, HDDs, SSDs, or other data storage devices. Each data storage device 1314 may include a system partition that stores data and firmware code for the data storage device 1314. Each data storage device 1314 may also include an operating system partition that stores data files and executables for an operating system.

Additionally or alternatively, the orchestrator server 1220 may include one or more peripheral devices 1316. Such peripheral devices 1316 may include any type of peripheral device commonly found in a compute device such as a display, speakers, a mouse, a keyboard, and/or other input/output devices, interface devices, and/or other peripheral devices.

Figure 14:
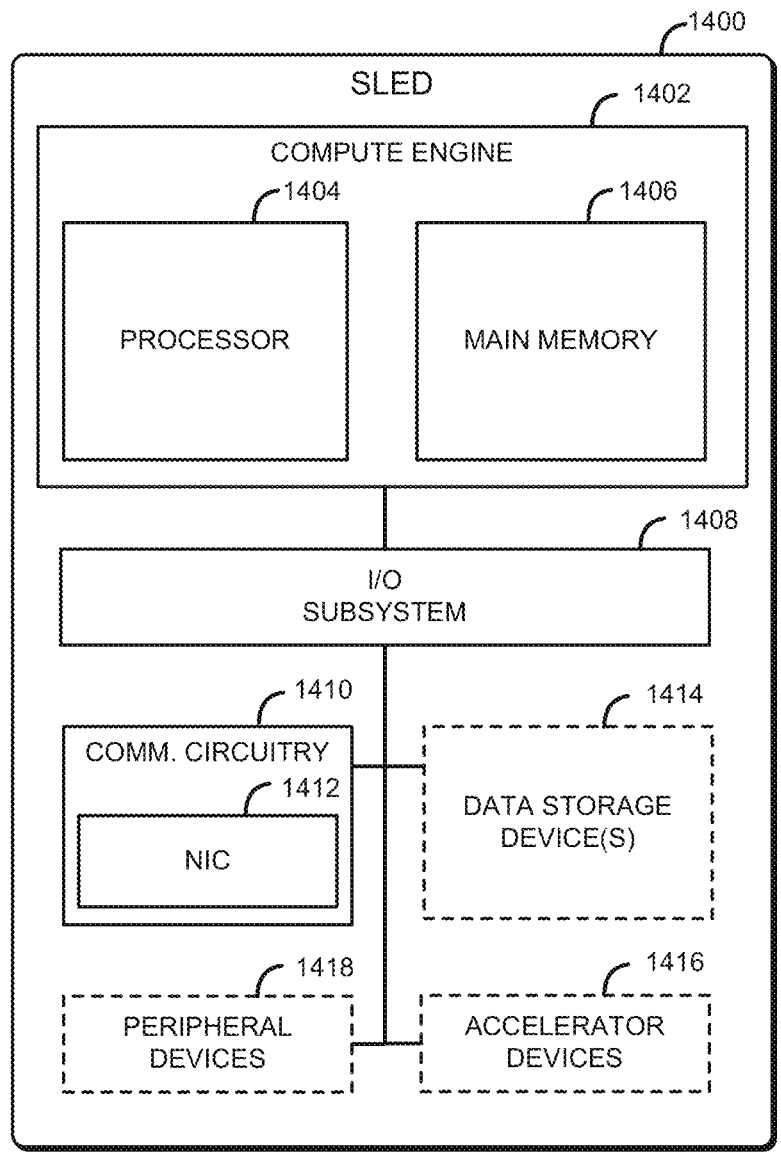
FIG. 14 is a simplified block diagram of at least one embodiment of a sled of the system of FIG. 12.

FIG. 14 illustrates a sled 1400 representative of any of the sleds 1230, 1240, 1250, and 1260, according to an embodiment. The sled 1400 may be embodied as including any type of compute device capable of performing the functions described herein, including generating manifest data indicative of one or more characteristics of the sled 1400, such as hardware resources, firmware resources, or a configuration for the sled 1400. The hardware resources may include resources relating to physical components of the sled 1400, such as devices installed on the sled 1400, processor count, processor capabilities, storage device capabilities, etc. The firmware resources may include any information relating to the firmware and versioning of the devices hosted on the sled 1400, such as BIOS version, storage device firmware version, memory firmware version, and the like. The characteristics of the configuration may include any information relating to how the sled 1400 or the devices thereon are configured, such as hyperthreading settings, memory speed settings, core frequency, and the like. The performed functions described herein also include associating an identifier with the generated manifest data, storing the manifest idea and identifier, and sending the manifest data and associated identifier to the orchestrator server 1220 (e.g., in response to a query).

As shown in FIG. 14, the sled 1400 includes a compute engine 1402, an input/output (I/O) subsystem 1408, communication circuitry 1410, and one or more data storage devices 1414. Of course, in other embodiments, the sled 1400 may include other or additional components, such as those commonly found in a computer (e.g., display, peripheral devices, etc.). For example, in embodiments in which the sled 1400 is an accelerator sled (such as accelerator sled 1260), the sled 1400 also includes one or more accelerator devices 1416 which may be embodied as any device or circuitry (e.g., a specialized processor, an FPGA, an ASIC, a graphics processing unit (GPU), reconfigurable hardware, etc.) capable of accelerating the execution of a function. Additionally, in some embodiments, one or more of the illustrative components may be incorporated in, or otherwise form a portion of, another component.

The compute engine 1402 may be embodied as any type of device or collection of devices capable of performing various compute functions described below. In some embodiments, the compute engine 1402 may be embodied as a single device such as an integrated circuit, an embedded system, a field-programmable gate array (FPGA), a system-on-a-chip (SOC), or other integrated system or device. Additionally, in some embodiments, the compute engine 1402 includes or is embodied as a processor 1404 and a memory 1406. The processor 1404 may be embodied as any type of processor capable of performing the functions described herein. For example, the processor 1404 may be embodied as a single or multi-core processor(s), a microcontroller, or other processor or processing/controlling circuit. In some embodiments, the processor 1404 may be embodied as, include, or be coupled to an FPGA, an application specific integrated circuit (ASIC), reconfigurable hardware or hardware circuitry, or other specialized hardware to facilitate performance of the functions described herein.

The main memory 1406 may be embodied as any type of volatile (e.g., dynamic random access memory (DRAM), etc.) or non-volatile memory or data storage capable of performing the functions described herein. In operation, the main memory 1406 may store various software and data used during operation such as manifest data indicative of resources provided by the sled 1400.

The compute engine 1402 is communicatively coupled with other components of other sleds present in the system 1210 (e.g., sleds 1230, 1240, 1250, and 1260) via the I/O subsystem 1408, which may be embodied as circuitry and/or components to facilitate input/output operations with the compute engine 1402 (e.g., with the processor 1404 and/or the main memory 1406) and other components of the sled 1400. For example, the I/O subsystem 1408 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1408 may form a portion of a system-on-a-chip (SoC) and be incorporated, along with one or more of the processor 1404, the main memory 1406, and other components of the sled 1400, into the compute engine 1402.

The communication circuitry 1410 may be embodied as any communication circuit, device, or collection thereof, capable of enabling communications over the network 1212 between the sled 1400 and another compute device (e.g., the orchestrator server 1220, the sleds 1230, 1240, 1250, 1260, etc.). The communication circuitry 1310 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1410 includes a network interface controller (NIC) 1412, which may also be referred to as a host fabric interface (HFI). The NIC 1412 may be embodied as one or more add-in-boards, daughter cards, network interface cards, controller chips, chipsets, or other devices that may be used by the sled 1400 to connect with another compute device (e.g., the orchestrator server 1220, the sleds 1230, 1240, 1250, 1260, etc.). In some embodiments, the NIC 1412 may be embodied as part of a system-on-a-chip (SoC) that includes one or more processors, or included on a multichip package that also contains one or more processors. In some embodiments, the NIC 1412 may include a local processor (not shown) and/or a local memory (not shown) that are both local to the NIC 1412. In such embodiments, the local processor of the NIC 1412 may be capable of performing one or more of the functions of the compute engine 1402 described herein. Additionally or alternatively, in such embodiments, the local memory of the NIC 1412 may be integrated into one or more components of the sled 1400 at the board level, socket level, chip level, and/or other levels.

The one or more illustrative data storage devices 1414, may be embodied as any type of devices configured for short-term or long-term storage of data such as, for example, memory devices and circuits, memory cards, hard disk drives, solid-state drives, or other data storage devices. Each data storage device 1414 may include a system partition that stores data and firmware code for the data storage device 1414. Each data storage device 1414 may also include an operating system partition that stores data files and executables for an operating system.

Additionally or alternatively, the sled 1400 may include one or more peripheral devices 1418. Such peripheral devices 1418 may include any type of peripheral device commonly found in a compute device such as a display, speakers, a mouse, a keyboard, and/or other input/output devices, interface devices, and/or other peripheral devices.

The client device 1214 and other sleds 1230, 1240, 1250, and 1260 may have components similar to those described in FIGS. 13 and 14. The description of those components of the orchestrator server 1220 and the sled 1400 is equally applicable to the description of components of those devices and is not repeated herein for clarity of the description. Further, it should be appreciated that any of the client device 1214, the orchestrator server 1220, and the sleds 1230, 1240, 1250, and 1260 may include other components, sub-components, and devices commonly found in a computing device, which are not discussed above in reference to the orchestrator server 1220 and the sled 1400 and not discussed herein for clarity of the description.

As described above, the client device 1214, the orchestrator server 1220, and the sleds 1230, 1240, 1250, and 1260 are illustratively in communication via the network 1212, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 15:
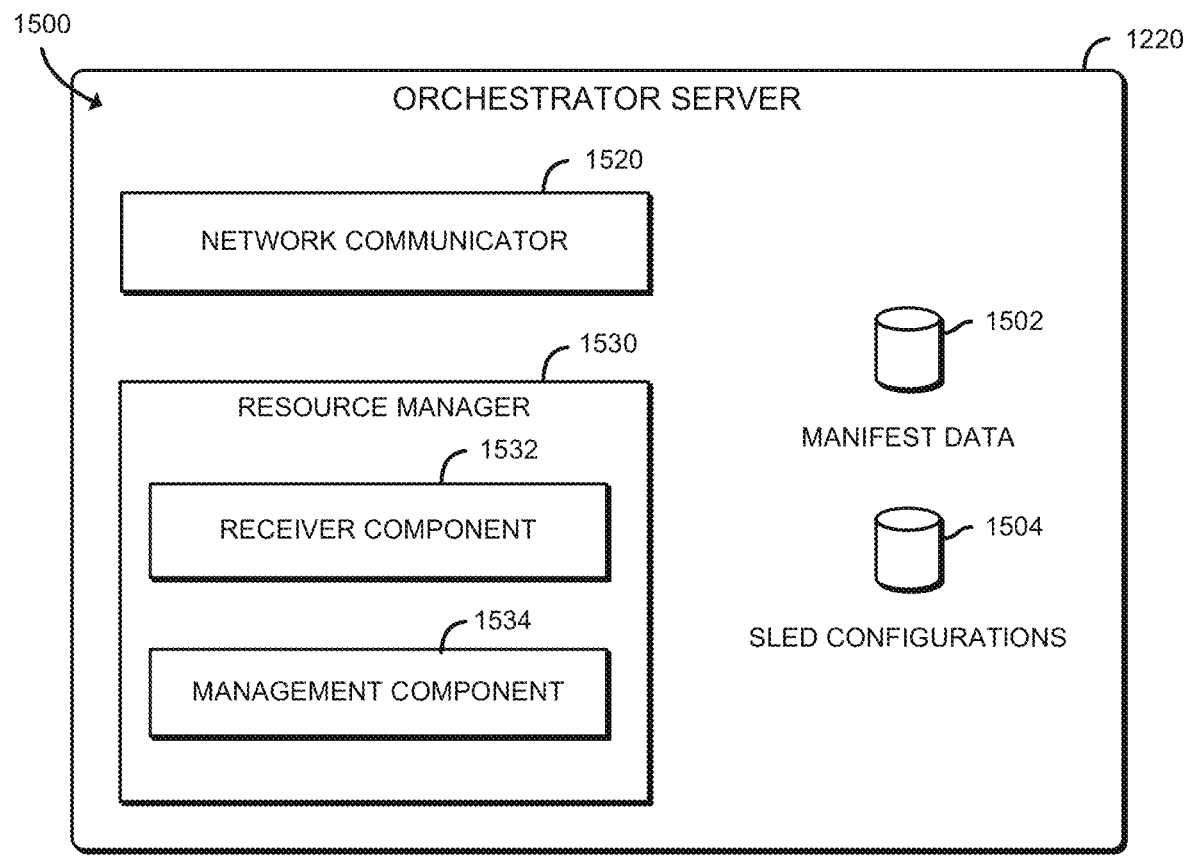
FIG. 15 is a simplified block diagram of at least one embodiment of an environment that may be established by the orchestrator server of FIGS. 12 and 13.

Referring now to FIG. 15, the orchestrator server 1220 may establish an environment 1500 during operation. The illustrative environment 1500 includes a network communicator 1520 and a resource manager 1530. Each of the components of the environment 1500 may be embodied as hardware, firmware, software, or a combination thereof. As such, in some embodiments, one or more of the components of the environment 1500 may be embodied as circuitry or a collection of electrical devices (e.g., network communicator circuitry 1520, resource manager circuitry 1530, etc.). It should be appreciated that, in such embodiments, one or more of the network communicator circuitry 1520 or the resource manager circuitry 1530 may form a portion of one or more of the compute engine 1302, the communication circuitry 1310, the I/O subsystem 1308, and/or other components of the orchestrator server 1220. In one embodiment, the environment 1500 includes manifest data 1502, which may be embodied as any data indicative of one or more characteristics (e.g., hardware resources, firmware resources, a configuration, component health) of any of the sleds in the system 1210, such as the sled 1400. The environment 1500 also includes sled configurations 1504, which may be embodied as any data indicative of sled and composed node configurations in the system 1210.

In some embodiments, the manifest data 1502 may reside on the orchestrator server 1220 in a data store, such as a file system, relational database, key-value store, and so on. The manifest data 1502 may be stored as a mark-up language file, spreadsheet, text document, and the like. Further, the manifest data 1502 may include information for a given sled indicative of the resources provided by that sled, such as hardware resources (e.g., number of processors, type of processors, storage capacity, I/O devices, etc.), firmware resources (e.g., firmware version information), sled configuration (e.g., core frequency, I/O operations per second (LOPS), boot device order, etc.), and component health (e.g., level of wear on storage devices, PCIe lane connectivity, diagnostic information for each device, etc.). Further, the manifest data 1502 for a given sled may comprise separate manifests for the hardware resources, firmware resources, the sled configuration, and the component health. Each manifest itself may be associated with an identifier that uniquely identifies the sled, such as a UUID. Doing so allows the orchestrator server 1220 to retrieve a manifest by the UUID, such as by using the UUID as a lookup value. Further, each manifest may include subsystem information for each characteristic. For example, a hardware manifest may present a storage device as a parent node and information describing the hardware as child nodes.

In some embodiments, the sled configurations 1504 may reside on the orchestrator server 1220 in a in a data store, such as a file system, relational database, key-value store, and so on. Generally, the sled configurations 1504 provide information to the orchestrator server 1220 relating to each sled in the system 1210, such as UUIDs associated with a given sled. In addition, the sled configurations 1504 provide composed node data, such as identifiers of the sleds in the system 1210 that form a given managed node, resources provided by the managed node, workloads assigned to the managed node, and the like.

Illustratively, the network communicator 1520, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the orchestrator server 1220, respectively. To do so, the network communicator 1520 is configured to receive and process data packets from one system or computing device (e.g., the compute sled 1230) and to prepare and send data packets to another computing device or system (e.g., the sleds 1230, 1240, 1250, and 1260). Accordingly, in some embodiments, at least a portion of the functionality of the network communicator 1520 may be performed by the communication circuitry 1310, and, in the illustrative embodiment, by the NIC 1312.

The resource manager 1530, which may be embodied as hardware, firmware, software, virtualized hardware, emulated architecture, and/or a combination thereof, is configured to identify the workloads, classify the workloads, identify trends in the resource utilization of the workloads, and predict future resource utilizations of the workloads. In addition, the resource manager 1530 composes nodes from sleds in the system 1210 to process the workloads. For example, the resource manager 1530 may compose a node based on resource requirements of the workload and assign that workload to the composed node. Further, the resource manager 1530 is configured to adjust the assignments of the workloads to nodes and the settings of the nodes to increase the resource utilization (e.g., to reduce the amount of idle resources) without overloading the resources and while staying in compliance with the resource requirements. As shown, the resource manager 1530 includes a receiver component 1532 and a management component 1534.

In one embodiment, the receiver component 1532 is configured to query a sled for manifest data indicative of resources of the sled (e.g., hardware and firmware resources) and a sled configuration. To do so, the receiver component 1532 may forward the request to the network communicator 1520, which generates a data packet representative of the request and sends the data packet to the sled. In response, the sled transmits the manifest data to the resource manager 1530, which, in turn, stores the manifest data (e.g., as manifest data 1502). To do so, the receiver component 1532 may identify a UUID of the sled (by evaluating the sled configurations 1504 or the manifest data provided by the sled) and associate the UUID with the obtained manifest data. The receiver component 1532 may then store the manifest data with the associated UUID. Once stored, the receiver component 1532 does not need to transmit a subsequent query to the sled for manifest data. Specifically, in events where the resource manager 1530 needs to ascertain the resources provided by a given sled, the resource manager 1530 may locally retrieve the manifest data 1502 indicative of the resources. Further, in the event of an update to the manifest data 1502, the sled automatically sends (e.g., in response to detecting a change in the hardware resources on the sled) the update to the corresponding manifest data 1502 to the resource manager 1530, as described further relative to FIG. 16.

In one embodiment, the management component 1534 is configured to evaluate a given workload to determine resource requirements for processing the workload. For example, the workload may specify a workload type, set of tasks, and time requirements that are indicative to the management component 1534 of what resources should be applied to the workload. Once determined, the management component 1534 may compose a node comprising one or more sleds (e.g., compute sled 1230, memory sled 1240, data storage sled 1250, or accelerator sled 1260). To determine which sleds to include in the node, the management component 1534 may evaluate the manifest data 1502 of each sled. In particular, the management component 1534 may perform a lookup using the UUID associated with the sled and retrieve the resulting manifest data 1502. Doing so allows the management component 1534 to identify sleds that have resources that satisfy the requirements for the workload. The management component 1534 then composes the node based on the manifest data 1502.

The management component 1534 is further configured to update the manifest data 1502 in response to obtaining an update to the manifest data 1502 from a sled (e.g., by the receiver component 1532). Updates to the manifest data 1502 can include the addition or removal of resources, updates to firmware versions, and changes in configuration of a given sled. Further, in some embodiments, the updates received can include a description indicative of changes to the manifest data, rather than an entire updated manifest. Doing so can reduce the amount of data communicated between a given sled and the orchestrator server 1220. Once received, the management component 1534 may retrieve the locally stored manifest data 1502 (e.g., by using the UUID provided with the update as a lookup key) and modify the data 1502 therein.

It should be appreciated that each of the receiver component 1532 and the management component 1534 may be separately embodied as hardware, firmware, software, virtualized hardware, emulated architecture, and/or a combination thereof. For example, the receiver component 1532 may be embodied as a hardware component, while the management component 1534 is embodied as virtualized hardware components or as some other combination of hardware, firmware, software, virtualized hardware, emulated architecture, and/or a combination thereof.

Figure 16:
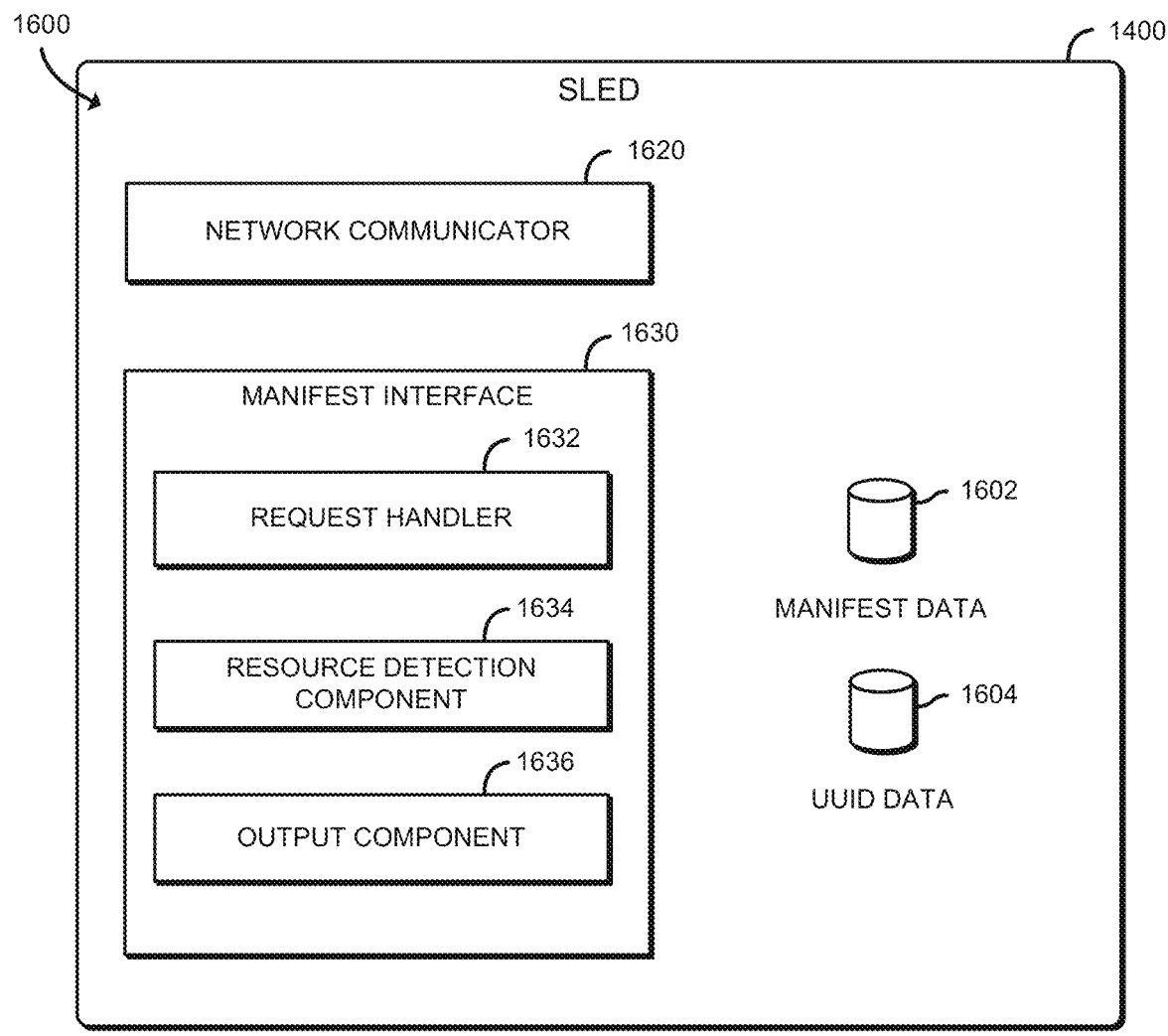
FIG. 16 is a simplified block diagram of at least one embodiment of an environment that may be established by the sled of FIGS. 12 and 14.

Referring now to FIG. 16, the sled 1400 may establish an environment 1600 during operation. Illustratively, the environment 1600 includes a network communicator 1620 and a manifest interface 1630. Each of the components of the environment 1600 may be embodied as hardware, firmware, software, or a combination thereof. As such, in some embodiments, one or more of the components of the environment 1600 may be embodied as circuitry or a collection of electrical devices (e.g., network communicator circuitry 1620, manifest interface circuitry 1630, etc.). It should be appreciated that, in such embodiments, one or more of the network communicator circuitry 1620 or manifest interface circuitry 1630 may form a portion of one or more of the compute engine 1402, the communication circuitry 1412, the I/O subsystem 1408, and/or other components of the sled 1400. As shown, the environment 1600 includes manifest data 1602, which may be embodied as any data indicative of one or more characteristics of the sled 1400, such as hardware resources, firmware resources, or sled configuration present on the sled 1400. Further, the environment 1600 includes UUID data 1604, which may be embodied as any data indicative of one or more identifiers (e.g., UUIDs) that uniquely identifies the sled 1400.

In the illustrative environment 1600, the network communicator 1620, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the sled 1400, respectively. To do so, the network communicator 1620 is configured to receive and process data packets from one system or computing device (e.g., the orchestrator server 1220) and to prepare and send data packets to another computing device or system (e.g., the compute sled 1230). Accordingly, in some embodiments, at least a portion of the functionality of the network communicator 1620 may be performed by the communication circuitry 1410, and, in the illustrative embodiment, by the NIC 1412.

The manifest interface 1630, which may be embodied as hardware, firmware, software, virtualized hardware, emulated architecture, and/or a combination thereof, is configured to generate manifest data 1602 (or updates to the manifest data 1602) and UUID data 1604 that uniquely identifies the sled 1400, associate UUID data 1604 with manifest data 1602, and send the manifest data 1602 to the orchestrator server 1220 (e.g., in response to a query by the orchestrator server 1220, following an update to the manifest data 1602, etc.). To do so, in one embodiment, the manifest interface 1630 includes a request handler 1632, a resource detection component 1634, and an output component 1636.

In one embodiment, the request handler 1632 is configured to receive and process queries for manifest data 1602 requested by the orchestrator server 1220. The request handler 1632 may detect the queries via the network communicator 1620. Further, the request handler 1632 determines whether a request is properly formatted, such as whether the request includes a UUID associated with the sled 1400 (as provided by the UUID data 1604).

In one embodiment, the resource detection component 1634 is configured to determine characteristics of the sled, such as hardware resources in the sled, firmware resources in the sled, a sled configuration, and health information of sled components. For example, to do so, the resource detection component 1634 may communicate with hardware buses on the sled 1400 to determine hardware connected with the sled. The resource detection component 1634 may also evaluate drivers in the system and determine firmware versions based on the evaluation. In addition, the resource detection component 1634 may communicate with hardware components (e.g., through the drivers or application programming interfaces (APIs) used to communicate with the firmware) to determine a configuration of each of the hardware components. The resource detection component 1634 may forward the detected information to the output component 1636. Further, in some embodiments, the resource detection component 1634 may verify, via a predefined function, the authenticity of the hardware resources. Further still, the robots discussed relative to FIG. 11 may be used to perform certain sled configuration and provisioning processes to facilitate sled acceptance into the physical infrastructure. The resource detection component 1634 may communicate with the robots, e.g., via an API, to obtain data from the sled configuration and provisioning processes.

The resource detection component 1634 may determine the resources, configuration, and health in response to a query for the manifest data 1602 by the orchestrator server 1220. Further, the resource detection component 1634 may execute at specified intervals to determine whether changes to the resources have occurred. In such a case, the resource detection component 1634 is further configured to determine the changes that occurred and forward the detected changes to the output component 1636.

In one embodiment, the output component 1636 is configured to generate (or update) manifest data 1602 based on the information provided by the resource detection component 1634 and to transmit the manifest data 1602 (or updates to the manifest data 1602) to the orchestrator server 1220. For instance, the output component 1636 may generate the manifest data 1602 by creating a file to store the information provided by the resource detection component 1634, such as a markup language file, spreadsheet, or text file. Once created, the output component 1636 may associate one or more of the UUID data 1604 with the manifest data. As stated, the UUID data 1604 includes identifiers that uniquely identifies the sled. The output component 1636 itself may generate the UUID data 1604, or the UUID data 1604 may be predefined, such as during manufacture of the sled 1400. Further, in some embodiments, the manifest data 1602 is stored locally in a storage device that allows external entities to access the content of the device, even if the sled is powered off. For instance, the storage device may include an RFID tag that the external entity may scan, allowing the external entity to access the manifest data 1602. Doing so allows the external entity to troubleshoot issues with the sled and also manage inventory without the sled needing to be powered on.

Figure 17:
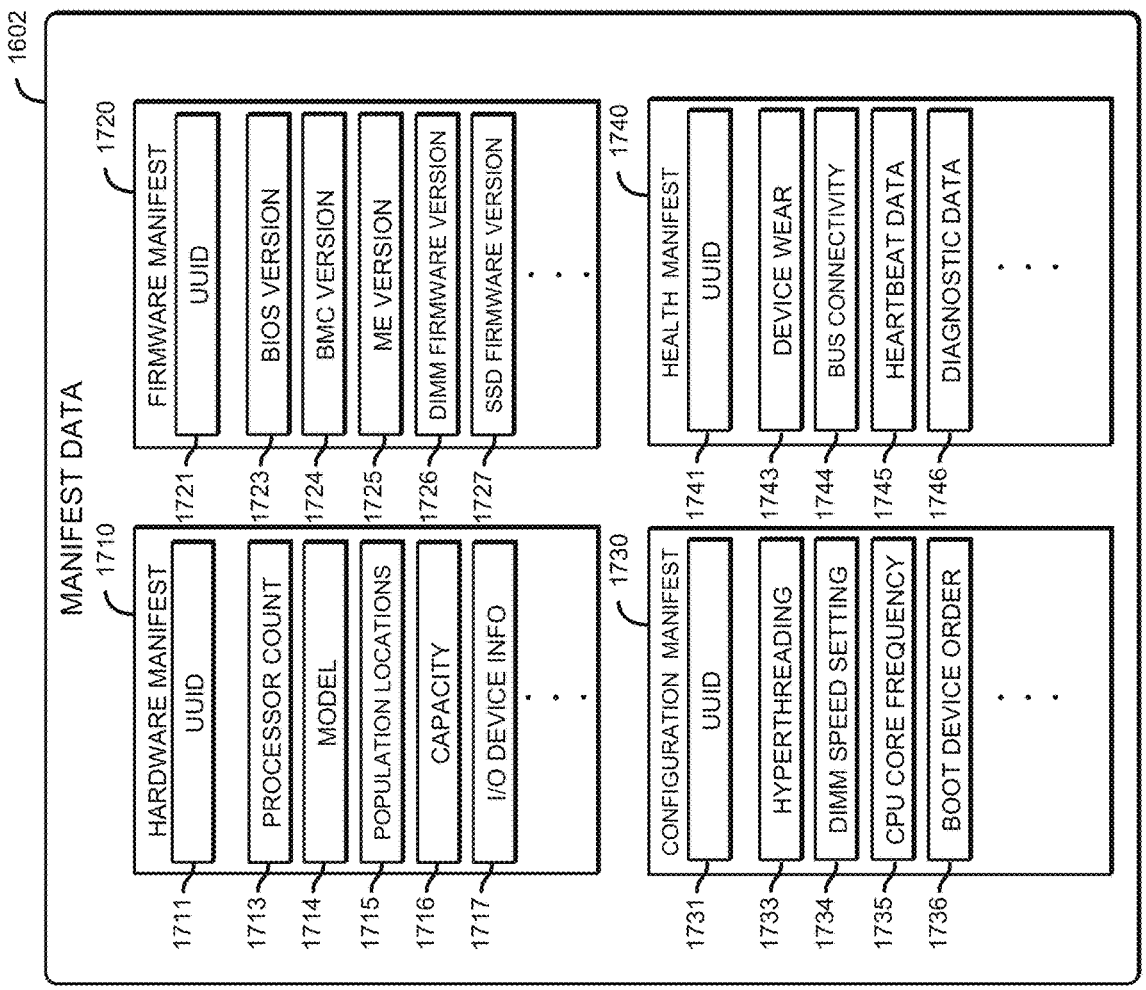
FIG. 17 is a diagram of an example embodiment of manifest data indicative of the resources of a sled.

Referring now to FIG. 17, a diagram of an example embodiment of the manifest data 1602 is shown. Illustratively, the manifest data 1602 may be represented as separate manifests, including a hardware manifest 1710, a firmware manifest 1720, a configuration manifest 1730, and a health manifest 1740. Although FIG. 17 depicts the manifests separately, the manifest data 1602 may also be represented collectively, e.g., in a single file.

As shown, each of the hardware manifest 1710, firmware manifest 1720, configuration manifest 1730, and health manifest 1740 are associated with a UUID (here, UUID 1711, UUID 1721, UUID 1731, and UUID 1731 respectively). The UUID allows the orchestrator server 1220 to associate the manifest data 1602 to a particular sled. In the illustrative embodiment, the sled 1400 (e.g., using the output component 1636) may create the UUID (or otherwise predefined) to associate with each of the hardware manifest, 1710, the firmware manifest 1720, the configuration manifest 1730, and health manifest 1740. Although FIG. 17 depicts each manifest as including its own identifier, one having skill in the art will recognize that the manifests may each be associated with the UUID of the sled.

Illustratively, FIG. 17 also depicts non-limiting examples of information that each of the manifests may provide. For instance, the hardware manifest 1710 includes a processor count 1713, model 1714 (e.g., of a processor, storage device, etc.), population locations 1715 of the hardware, capacity 1716 (e.g., provided by storage devices on the sled 1400), and I/O device info 1717. As another example, the firmware manifest includes a BIOS version 1723, a baseboard management controller (BMC) version 1724, a management engine (ME) version 1725, a dual in-line memory module (DIMM) version 1726, and an SSD firmware version 1727. As yet another example, the configuration manifest 1730 includes an indication of whether an ability to operate a single processor core as multiple virtual cores is enabled (e.g., hyperthreading 1733), a dual inline memory module (DIMM) speed setting 1734, a CPU core frequency 1735, and a boot device order 1736. Still, as another example, the health manifest 1740 includes an indication of device wear 1743 (e.g., a level of wear on an SSD device), an indication of bus connectivity 1744, heartbeat data 1745, and diagnostic data 1746. It should be understood that the manifests 1710, 1720, 1730, and 1740 may include other data representative of the hardware, firmware, and configuration of the corresponding sled 1400.

Figure 18:
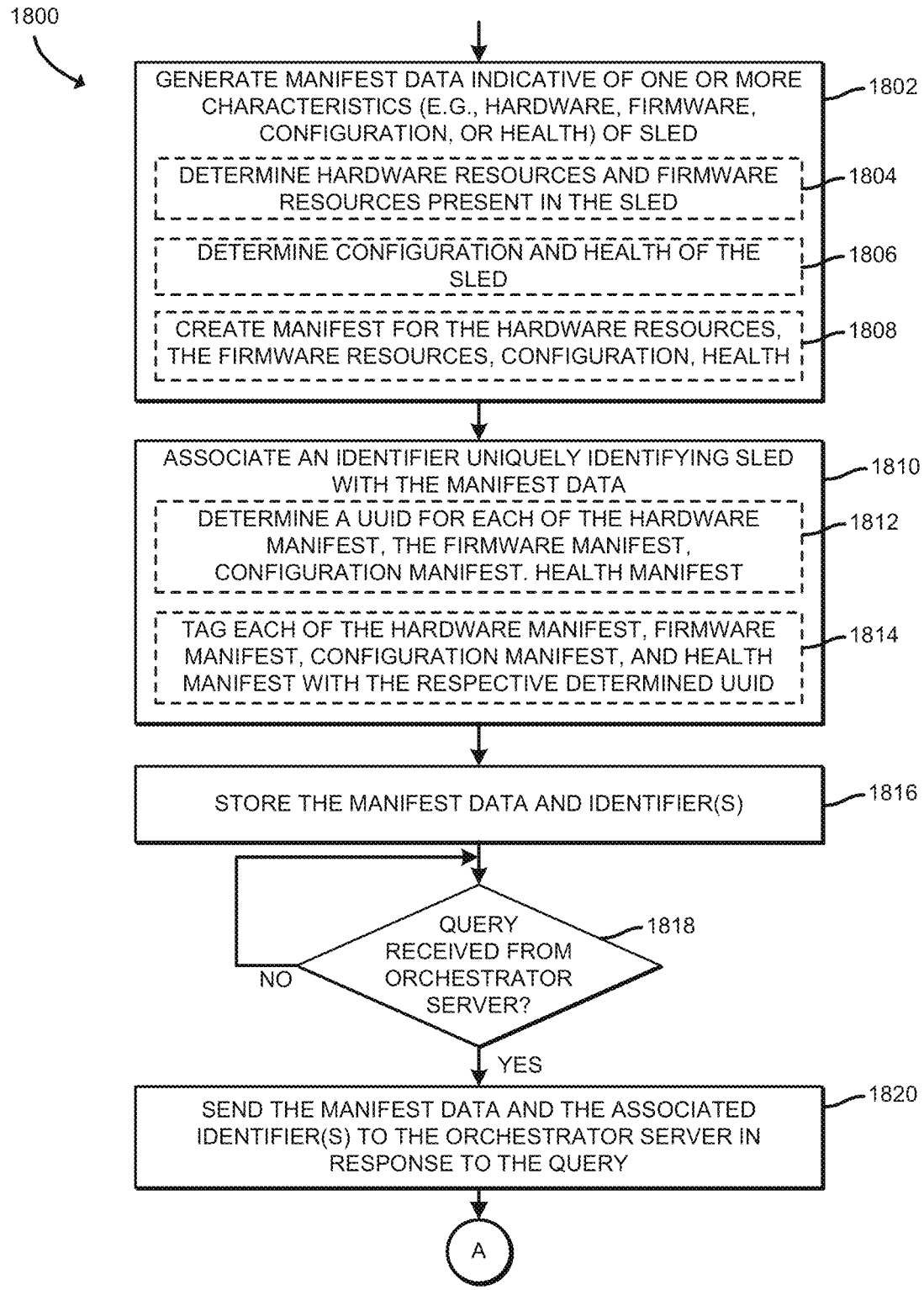
FIGS. 18 and 19 are a simplified flow diagram of at least one embodiment of a method for generating manifest data.

Referring now to FIG. 18, the sled 1400, in operation, may execute a method 1800 to generate manifest data. The method 1800 begins with block 1802, in which the sled 1400 generates manifest data indicative of one or more characteristics of the sled (e.g., hardware resources, firmware resources, configuration of the sled, or health of sled components). In particular, in block 1804, the sled 1400 determines hardware and firmware resources present in the sled. For example, to do so, the sled 1400 communicates with hardware via an interconnect bus to determine the hardware devices present on the sled. The sled 1400 also communicates with the firmware and device drivers to determine versioning information. In block 1806, the sled 1400 determines a configuration of the sled and health of sled components. The sled 1400 does so by evaluating the hardware and firmware of the devices to identify configuration settings for each device, such as CPU core frequency, boot device order, and the like. The sled 1400 may also send a message to hardware components requesting health and diagnostic information to obtain such data from the components. Additionally or alternatively, the sled 1400 may execute predefined diagnostic tests on the hardware components to obtain such data. In block 1808, the sled 1400 then creates a manifest based on the determined information for each of the hardware resources, firmware resources, sled configuration, and sled component health. As noted, the sled 1400 may generate separate manifests for each of the hardware resources, firmware resources, sled configuration, and sled component health, populating each manifest with the determined in formation.

In block 1810, the sled 1400 associates an identifier that uniquely identifies the sled 1400 with the manifest data. In particular, in block 1812, the sled 1400 determines a UUID for each of the hardware manifest, the firmware manifest, the configuration manifest, and/or the health manifest. As stated, the UUID may be generated by the sled itself or determined in advance (e.g., during manufacture of the sled). In block 1814, the sled 1400 tags each manifest with the respective determined UUID. At block 1816, the sled 1400 then stores the manifest data and associated identifiers. For example, the sled 1400 may provide the manifest data as part of a data store where the data can be retrieved, e.g., based on lookup of the associated UUID.

As stated, the sled 1400 may receive queries by the orchestrator server 1220 for the stored manifest data. At block 1818, the sled 1400 determines whether a query has been received from the orchestrator server 1220. In the event that a query has been received, the method 1800 advances to block 1820, in which the sled 1400 sends the manifest data and the associated identifiers to the orchestrator server 1220 in response to the query.

Figure 19:
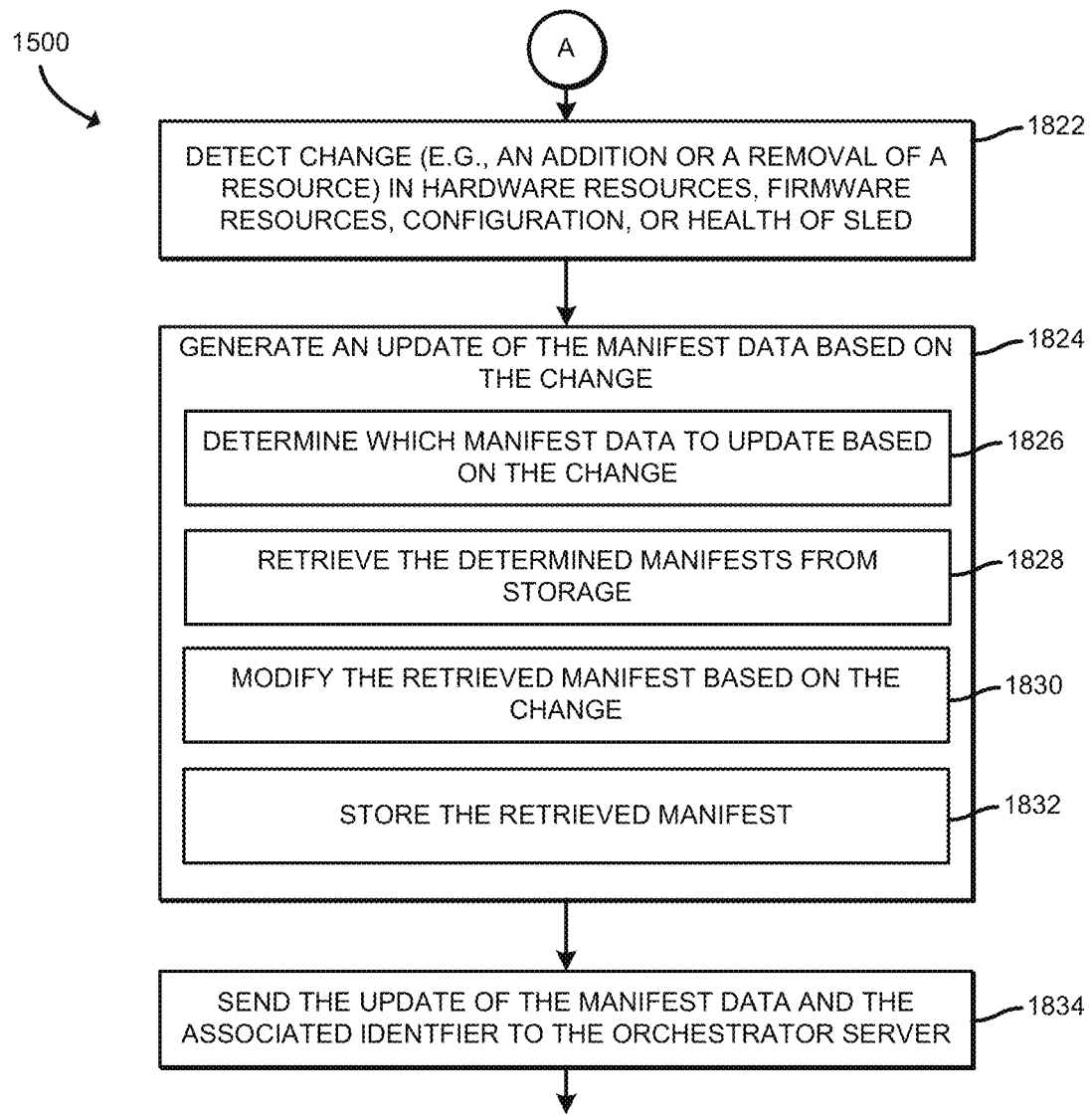

In some situations, resources provided by the sled 1400 may change, (e.g., resources are added, removed, or otherwise become inoperative). Referring now to FIG. 19, in block 1822, the sled 1400 detects a change in at least one of the hardware resources, firmware resources, sled configuration, or sled component health. For example, if the sled 1400 is deactivated to install an SSD device and is subsequently rebooted, the sled 1400 may detect the installed SSD device. Consequently, the manifest data would require an update to reflect the addition, such as changes to the hardware (e.g., the addition of the SSD device, the total capacity provided by the sled 1400), changes to the firmware (e.g., the addition of a firmware version associated with the SSD device), and changes to the configuration (e.g., policies to be added or changed as a result of the addition of the SSD device). The manifest data would also be updated to reflect the overall health of the additional SSD device (e.g., such as wear on the SSD device, responsiveness of the SSD device, etc.). The sled 1400 detects such changes based on an evaluation of the present hardware, firmware, configuration, and health relative to the previously stored manifest data.

Once detected, the method 1800 advances to block 1824, in which the sled 1400 generates an update of the manifest data, based on the detected changes. In particular, in block 1826, the sled 1400 may determine which manifest data to update based on the change. Continuing the previous example, the sled 1400 may determine that because changes in the hardware, firmware, configuration, and health are present, each of the hardware manifest, firmware manifest, configuration manifest, and health manifest should be updated. In block 1828, the sled 1400 retrieves the determined manifest data from storage (e.g., the hardware manifest, firmware manifest, configuration manifest, and health manifest stored in a data storage device 1414). In block 1830, the sled 1400 modifies the retrieved manifest based on the change. Further, the sled 1400 may also generate a file indicative of the updates for transmission to the orchestrator server 1220. Once modified, at block 1832, the sled 1400 stores the updated manifest data.

In block 1834, the sled 1400 sends the update of the manifest data and the associated identifier of the updated manifest data to the orchestrator server 1220. In some embodiments, the sled 1400 sends the changes in the manifest data, rather than sending the entire updated manifest. Doing so reduces the amount of data to be sent over the network and may improve performance of both the sled 1400 and the orchestrator server 1220.

Figure 20:
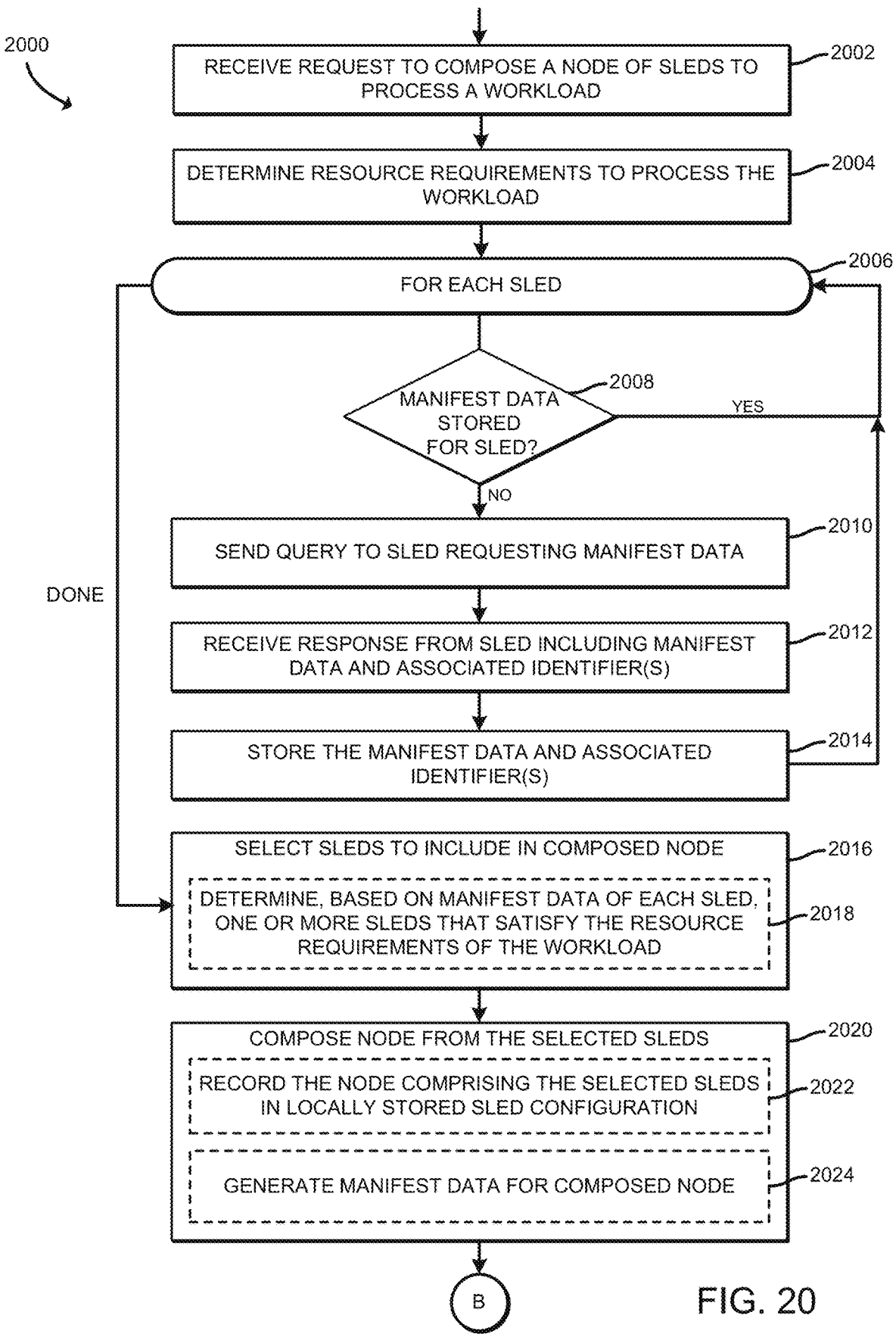
FIGS. 20 and 21 are a simplified flow diagram of at least one embodiment of a method for composing nodes of sleds based on manifest data.

Referring now to FIG. 20, the orchestrator server 1220, in operation, may execute a method 2000 to compose a node of sleds in the system 1210 based on manifest data. As shown, the method 2000 begins in block 2002, in which the orchestrator server 1220 receives a request to compose a node to process a workload. For instance, the resource manager 1530 may detect a new workload to be processed and forward information indicative of the workload to the receiver component 1532. In block 2004, the orchestrator server 1220 determines resource requirements to process the workload. For example, the orchestrator server 1220 may evaluate the information associated with the workload to determine expected resource utilization, network utilization, and capacity required to process the workload, as well as any time restraints associated with the workload.

In block 2006, the method 2000 enters a loop for each sled in the system 1210. In block 2008, the orchestrator server 1220 determines whether manifest data is locally stored for the sled. To do so, the orchestrator server 1220 may perform a lookup operation in the store hosting the manifest data 1502 using the UUID assigned to the sled (determined from sled configurations 1504). If manifest data is present, then the method 2000 returns to the beginning of the loop at block 2006 for the next sled. Otherwise, if manifest data is not present for that sled, the orchestrator server 1220 sends a query to the sled requesting manifest data, as indicated in block 2010. The orchestrator server 1220 may formulate the query by including, in a data packet, the UUID associated with the sled itself as well as a message in the payload having a request for the manifest data. In turn, the sled sends a response to the orchestrator server 1220 including the manifest data. In block 2012, the orchestrator server 1220 receives the response from the sled, which includes the manifest data, (e.g., a hardware manifest, a firmware manifest, a configuration manifest, and a health manifest), as well as identifiers (e.g., UUIDs) associated with each manifest. In block 2014, the orchestrator server 1220 stores the manifest data and associated identifiers. In particular, the orchestrator server 1220 stores the manifest data indexed by the associated identifier(s). In the illustrative embodiment, the orchestrator server 1220 stores the manifest data locally (e.g., in a data storage device 1314). As a result, the orchestrator server 1220 may determine the resources of the sled by retrieving the manifest data for the sled from a local store (e.g., the data storage device 1314), rather than querying the sled via a network connection (e.g., the communication circuitry 1310). Doing so may improve the speed of determining resource allocations and composition of nodes (e.g., following an outage, or upon detection of a workload) by reducing network communication between the orchestrator server 1220 and the sleds in ascertaining resources present in the sleds.

The loop, at block 2006 ends after each sled has been evaluated for manifest data that uniquely identifies the sled. The method 2000 subsequently advances to block 2016, in which the orchestrator server 1220 selects sleds to include in a composed node to service the workload. In particular, in block 2018, the orchestrator server 1220 determines, based on manifest data of each sled, one or more sleds that satisfy the resource requirements of the workload. The orchestrator server 1220 may further evaluate the determined sleds to ensure that the sleds have resources available to service the workload as part of the node.

In block 2020, the orchestrator server 1220 composes the node from the selected sleds. In particular, in block 2022, the orchestrator server 1220 records the node comprising the selected sleds in the sled configuration 1504. In one embodiment, the orchestrator server 1220 may also generate a composed node manifest, which comprises a combination of the manifest data of each sled that is part of the composed node. For instance, the manifest for the composed node may include logical hardware configurations, firmware specifications, link connectivity, bandwidth data, and the health of the logical hardware configurations. In block 2024, the orchestrator server 1220 generates manifest data for the composed node. To do so, the orchestrator server 1220 may create a file that includes the collective manifest data of the sleds in the node. Further, the orchestrator server 1220 also generates a UUID to uniquely identify the composed node and associate that node with the composed node manifest data. The orchestrator server 1220 may then store the composed node manifest data locally with the associated UUID.

Figure 21:
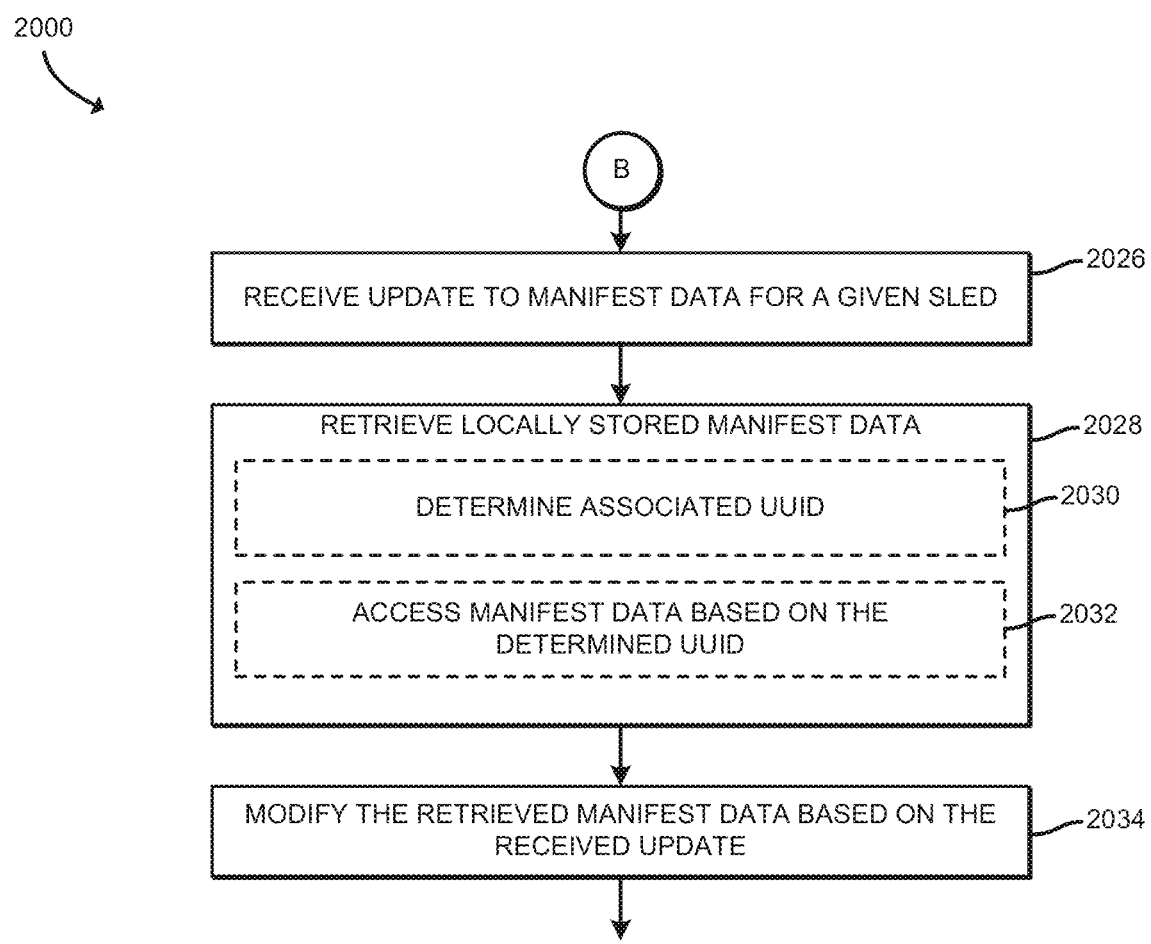

A given sled may send updates of the manifest data to the orchestrator server 1220. The sled does so without requiring the orchestrator server 1220 to generate another query to the sled. In such a case, and referring now to FIG. 21, in block 2026, the orchestrator server 1220 receives an update to the manifest data for a given sled. As stated, the update may include merely the change to the manifest data, rather than the entire manifest data for the sled. The update also includes an identifier (or identifiers) associated with the manifest data, depending on the changes made to the manifest data (e.g., whether the changes were made to one or more of the hardware manifest, firmware manifest, the configuration manifest, or the health manifest).

In block 2028, the orchestrator server 1220 retrieves the locally stored manifest data for that sled. For example, to do so, in block 2030, the orchestrator server 1220 determines the UUID associated with the update. The UUID may be included with the update sent by the sled. In block 2032, the orchestrator server 1220 accesses the manifest data based on the determined UUID. In block 2034, the orchestrator server 1220 modifies the retrieved manifest data based on the retrieved update. The orchestrator server 1220 may then store the modified manifest data locally by the UUID. Advantageously, because the sled automatically notifies the orchestrator server 1220 of changes in the hardware resources, firmware resources, sled configuration, or health in sled components, the orchestrator server 1220 has an up-to-date representation of resources and configuration present in the sled, without having to perform a subsequent query to the sled.

EXAMPLES

Illustrative examples of the technologies disclosed herein are provided below. An embodiment of the technologies may include any one or more, and any combination of, the examples described below.

Example 1 includes a sled, comprising a compute engine to generate manifest data indicative of one or more characteristics of the sled; associate an identifier with the manifest data, wherein the identifier identifies the sled from each of a plurality of sleds; and send the manifest data and the associated identifier to an orchestrator server.

Example 2 includes the subject matter of Example 1, and wherein the compute engine is further to detect a change in at least one or more of the characteristics of the sled; update the manifest data based on the detected change, wherein the update specifies the detected change in the one or more characteristics of the sled; and send the update of the manifest data to the orchestrator server.

Example 3 includes the subject matter of any of Examples 1 and 2, and wherein to update the manifest data comprises to determine which of the manifest data to update based on the change; and modify the determined manifest data based on the change.

Example 4 includes the subject matter of any of Examples 1-3, and wherein the change is at least one of an addition of a first resource or a removal of a second resource.

Example 5 includes the subject matter of any of Examples 1-4, and wherein the update sent to the orchestrator server is an indication of the change to the manifest data.

Example 6 includes the subject matter of any of Examples 1-5, and wherein the manifest data includes at least one hardware manifest, firmware manifest, configuration manifest, or health manifest.

Example 7 includes the subject matter of any of Examples 1-6, and wherein the hardware manifest specifies at least one of a processor count, a processor model, dual in-line memory module (DIMM) types, population locations, capacity, or I/O devices.

Example 8 includes the subject matter of any of Examples 1-7, and wherein the firmware manifest specifies at least one of a BIOS version, baseboard management controller (BMC) version, DIMM firmware version, or solid state drive (SSD) version.

Example 9 includes the subject matter of any of Examples 1-8, and wherein the configuration manifest of the sled comprises at least one of an indication of whether an ability to operate a processor core as multiple virtual cores is enabled, a DIMM speed setting, a CPU core frequency, or a boot device order.

Example 10 includes the subject matter of any of Examples 1-9, and wherein to generate the manifest data indicative of the one or more characteristics of the sled comprises to determine hardware resources and firmware resources present in the sled; determine a configuration of the sled; determine a health of the hardware resources of the sled; and create the hardware manifest based on the hardware resources present, the firmware manifest based on the firmware resources present, the configuration manifest based on the determined configuration, and the health manifest based on the health of the hardware resources of the sled.

Example 11 includes the subject matter of any of Examples 1-10, and wherein to associate the identifier with the manifest data comprises to determine a first identifier for the hardware manifest, a second identifier for the firmware manifest, and a third identifier for the configuration manifest; and tag the first identifier to the hardware manifest, the second identifier to the firmware manifest, and the third identifier to the configuration manifest.

Example 12 includes the subject matter of any of Examples 1-11, and wherein to send the manifest data and the associated identifier comprises to send the manifest data and the associated identifier in response to a request from the orchestrator server for the manifest data.

Example 13 includes the subject matter of any of Examples 1-12, and wherein the system includes a node comprising at least the sled, wherein the node is composed based, in part, on the manifest data.

Example 15 includes a method comprising generating, by a sled, manifest data indicative of one or more characteristics of the sled, wherein the sled is one of a plurality of sleds in a system; associating, by the sled, an identifier with the manifest data, wherein the identifier identifies the sled from each of the plurality of sleds; and sending, by the sled, the manifest data and the associated identifier to an orchestrator server.

Example 16 includes the subject matter of Example 15, and further including detecting, by the sled, a change in at least one or more of the characteristics of the sled; updating the manifest data based on the detected change, wherein the update specifies the detected change in the one or more characteristics of the sled; and sending, by the sled, the update of the manifest data to the orchestrator server.

Example 17 includes the subject matter of any of Examples 15 and 16, and wherein the update sent to the orchestrator server is an indication of the change to the manifest data.

Example 18 includes the subject matter of any of Examples 15-17, and wherein the manifest data includes at least one hardware manifest, firmware manifest, configuration manifest, or health manifest.

Example 19 includes the subject matter of any of Examples 15-18, and wherein the hardware manifest specifies at least one of a processor count, a processor model, dual in-line memory module (DIMM) types, population locations, capacity, or I/O devices.

Example 20 includes the subject matter of any of Examples 15-19, and wherein the firmware manifest specifies at least one of a BIOS version, baseboard management controller (BMC) version, DIMM firmware version, or solid state drive (SSD) version.

Example 21 includes the subject matter of any of Examples 15-20, and wherein the configuration manifest of the sled comprises at least one of an indication of whether an ability to operate a processor core as multiple virtual cores is enabled, a DIMM speed setting, a CPU core frequency, or a boot device order.

Example 22 includes the subject matter of any of Examples 15-21, and wherein generating the manifest data indicative of the one or more characteristics of the sled comprises determining hardware resources and firmware resources present in the sled; determining a configuration of the sled; and creating the hardware manifest based on the hardware resources present, the firmware manifest based on the firmware resources present, and the configuration manifest based on the determined configuration.

Example 23 includes the subject matter of any of Examples 15-22, and wherein associating the at least the identifier with the manifest data comprises determining a first identifier for the hardware manifest, a second identifier for the firmware manifest, and a third identifier for the configuration manifest; and tagging the first identifier to the hardware manifest, the second identifier to the firmware manifest, and the third identifier to the configuration manifest.

Example 24 includes the subject matter of any of Examples 15-23, and wherein sending the manifest data and the associated identifier comprises sending the manifest data and the associated identifier in response to a request from the orchestrator server for the manifest data.

Example 25 includes the subject matter of any of Examples 15-24, and wherein the system includes a node comprising at least the sled, wherein the node is composed based, in part, on the manifest data.

Example 26 includes one or more machine-readable storage media comprising a plurality of instructions stored thereon that, in response to being executed, cause a sled to perform the method of any of Examples 16-27.

Example 27 includes a sled comprising means for performing the method of any of Examples 16-27.

Example 28 includes a sled comprising a compute engine to perform the method of any of Examples 16-27.

Example 29 includes a sled comprising resource manager circuitry to generate manifest data indicative of one or more characteristics of the sled; and associate an identifier with the manifest data, wherein the identifier identifies the sled from each of a plurality of sleds; and network communicator circuitry to send the manifest data and the associated identifier to an orchestrator server.

Example 30 includes the subject matter of Example 29, and wherein the resource manager circuitry is further to detect a change in at least one or more of the characteristics of the sled; and update the manifest data based on the detected change, wherein the update specifies the detected change in the one or more characteristics of the sled; and wherein the network communicator circuitry is further to send the update of the manifest data to the orchestrator server.

Example 31 includes the subject matter of any of Examples 29 and 30, and wherein to update the manifest data comprises to determine which of the manifest data to update based on the change; and modify the determined manifest data based on the change.

Example 32 includes the subject matter of any of Examples 29-31, and wherein the change is at least one of an addition of a first resource or a removal of a second resource.

Example 33 includes the subject matter of any of Examples 29-32, and wherein the update sent to the orchestrator server is an indication of the change to the manifest data.

Example 34 includes the subject matter of any of Examples 29-33, and wherein the manifest data includes at least one hardware manifest, firmware manifest, configuration manifest, or health manifest.

Example 35 includes the subject matter of any of Examples 29-34, and wherein the hardware manifest specifies at least one of a processor count, a processor model, dual in-line memory module (DIMM) types, population locations, capacity, or I/O devices.

Example 36 includes the subject matter of any of Examples 29-35, and wherein the firmware manifest specifies at least one of a BIOS version, baseboard management controller (BMC) version, DIMM firmware version, or solid state drive (SSD) version.

Example 37 includes the subject matter of any of Examples 29-36, and wherein the configuration manifest of the sled comprises at least one of an indication of whether an ability to operate a processor core as multiple virtual cores is enabled, a DIMM speed setting, a CPU core frequency, or a boot device order.

Example 38 includes the subject matter of any of Examples 29-37, and wherein to generate the manifest data indicative of the one or more characteristics of the sled comprises to determine hardware resources and firmware resources present in the sled; determine a configuration of the sled; determine a health of the hardware resources of the sled; and create the hardware manifest based on the hardware resources present, the firmware manifest based on the firmware resources present, the configuration manifest based on the determined configuration, and the health manifest based on the health of the hardware resources of the sled.

Example 39 includes the subject matter of any of Examples 29-38, and wherein to associate the identifier with the manifest data comprises to determine a first identifier for the hardware manifest, a second identifier for the firmware manifest, and a third identifier for the configuration manifest; and tag the first identifier to the hardware manifest, the second identifier to the firmware manifest, and the third identifier to the configuration manifest.

Example 40 includes the subject matter of any of Examples 29-39, and wherein to send the manifest data and the associated identifier comprises to send the manifest data and the associated identifier in response to a request from the orchestrator server for the manifest data.

Example 41 includes the subject matter of any of Examples 29-40, and wherein the system includes a node comprising at least the sled, wherein the node is composed based, in part, on the manifest data.

Example 42 includes the subject matter of any of Examples 29-41, and wherein the resource manager circuitry is further to generate the manifest data for the composed node.

Example 43 includes a sled comprising means for generating manifest data indicative of one or more characteristics of the sled, wherein the sled is one of a plurality of sleds in a system; means for associating an identifier with the manifest data, wherein the identifier identifies the sled from each of the plurality of sleds; and circuitry for sending the manifest data and the associated identifier to an orchestrator server.

Example 44 includes the subject matter of Example 43, and further including means for detecting a change in at least one or more of the characteristics of the sled; means for updating the manifest data based on the detected change, wherein the update specifies the detected change in the one or more characteristics of the sled; and circuitry for sending the update of the manifest data to the orchestrator server.

Example 45 includes the subject matter of any of Examples 43 and 44, and wherein the update sent to the orchestrator server is an indication of the change to the manifest data.

Example 46 includes the subject matter of any of Examples 43-45, and wherein the manifest data includes at least one hardware manifest, firmware manifest, configuration manifest, or health manifest.

Example 47 includes the subject matter of any of Examples 43-46, and wherein the hardware manifest specifies at least one of a processor count, a processor model, dual in-line memory module (DIMM) types, population locations, capacity, or I/O devices.

Example 48 includes the subject matter of any of Examples 43-47, and wherein the firmware manifest specifies at least one of a BIOS version, baseboard management controller (BMC) version, DIMM firmware version, or solid state drive (SSD) version.

Example 49 includes the subject matter of any of Examples 43-48, and wherein the configuration manifest of the sled comprises at least one of an indication of whether an ability to operate a processor core as multiple virtual cores is enabled, a DIMM speed setting, a CPU core frequency, or a boot device order.

Example 50 includes the subject matter of any of Examples 43-49, and wherein the means for generating the manifest data indicative of the one or more characteristics of the sled comprises circuitry for determining hardware resources and firmware resources present in the sled; circuitry for determining a configuration of the sled; and circuitry for creating the hardware manifest based on the hardware resources present, the firmware manifest based on the firmware resources present, and the configuration manifest based on the determined configuration.

Example 51 includes the subject matter of any of Examples 43-50, and wherein the means for associating the at least the identifier with the manifest data comprises circuitry for determining a first identifier for the hardware manifest, a second identifier for the firmware manifest, and a third identifier for the configuration manifest; and circuitry for tagging the first identifier to the hardware manifest, the second identifier to the firmware manifest, and the third identifier to the configuration manifest.

Example 52 includes the subject matter of any of Examples 43-51, and wherein the circuitry for sending the manifest data and the associated identifier comprises circuitry for sending the manifest data and the associated identifier in response to a request from the orchestrator server for the manifest data.

Example 53 includes the subject matter of any of Examples 43-52, and wherein the system includes a node comprising at least the sled, wherein the node is composed based, in part, on the manifest data.

Example 54 includes an compute device comprising a compute engine to receive a request to compose a node from a plurality of sleds, wherein the node is to process a workload, select, as a function of manifest data associated with each of the plurality of sleds, one or more of the plurality of sleds to include in the composed node, and compose the node from the selected sleds in response to the request.

Example 55 includes the subject matter of Example 54, and wherein the manifest data associated with each of the plurality of sleds is indicative of one or more characteristics of the sled.

Example 56 includes the subject matter of any of Examples 54 and 55, and wherein the manifest data includes at least one hardware manifest, firmware manifest, configuration manifest, or health manifest.

Example 57 includes the subject matter of any of Examples 54-56, and wherein the compute engine is further to generate manifest data for the composed node, wherein the generated manifest data includes manifest data associated with each sled of the composed node.

Example 58 includes the subject matter of any of Examples 54-57, and wherein the compute engine is further to receive an update to manifest data associated with one of the sleds of the composed node; and modify the generated manifest data based on the received update.

Example 59 includes the subject matter of any of Examples 54-58, and wherein the update to the manifest data associated with one of the sleds of the composed node includes an identifier associated with the one of the sleds.

Example 60 includes the subject matter of any of Examples 54-59, and wherein the compute engine is further to modify manifest data stored on the compute device with the update based on the identifier.

Example 61 includes the subject matter of any of Examples 54-60, and wherein the update is an indication of a change to one or more characteristics of the one of the sleds.

Example 62 includes the subject matter of any of Examples 54-61, and wherein the change is one of an increase in resources of the one of the sleds or a decrease in resources of the one or the sleds.

Example 63 includes the subject matter of any of Examples 54-62, and wherein the compute engine is further to, for each sled determine whether manifest data for the sled is stored on the compute device; and upon a determination that the manifest data is not stored on the compute device, send a query to the sled requesting the manifest data.

Example 64 includes the subject matter of any of Examples 54-63, and wherein the compute engine is further to store the manifest data and an identifier associated with the sled on the compute device.

Example 65 includes the subject matter of any of Examples 54-64, and wherein to compose the node from the selected sleds comprises record the node comprising the selected sleds in a sled configuration stored on the compute device.

Example 66 includes the subject matter of any of Examples 54-65, and wherein the compute engine is further to determine one or more resource requirements of the workload.

Example 67 includes the subject matter of any of Examples 54-66, and wherein the selected one or more of the plurality of sleds satisfies resource requirements for the workload.

Example 68 includes a method comprising receiving, by a compute device, a request to compose a node from a plurality of sleds, wherein the node is to process a workload; selecting, as a function of manifest data associated with each of the plurality of sleds, one or more of the plurality of sleds to include in the composed node; and composing the node from the selected sleds in response to the request.

Example 69 includes the subject matter of Example 68, and wherein the manifest data associated with each of the plurality of sleds is indicative of one or more characteristics of the sled.

Example 70 includes the subject matter of any of Examples 68 and 69, and wherein the manifest data includes at least one hardware manifest, firmware manifest, configuration manifest, or health manifest.

Example 71 includes the subject matter of any of Examples 68-70, and further including generating manifest data for the composed node, wherein the generated manifest data includes manifest data associated with each sled of the composed node.

Example 72 includes the subject matter of any of Examples 68-71, and further including receiving an update to manifest data associated with one of the sleds of the composed node; and modifying the generated manifest data based on the received update.

Example 73 includes the subject matter of any of Examples 68-72, and wherein the update to the manifest data associated with one of the sleds of the composed node includes an identifier associated with the one of the sleds.

Example 74 includes the subject matter of any of Examples 68-73, and further including modifying manifest data stored on the compute device with the update based on the identifier.

Example 75 includes the subject matter of any of Examples 68-74, and wherein the update is an indication of a change to one or more characteristics of the one of the sleds.

Example 76 includes the subject matter of any of Examples 68-75, and wherein the change is one of an increase in resources of the one of the sleds or a decrease in resources of the one or the sleds.

Example 77 includes the subject matter of any of Examples 68-76, and further including, for each sled determining whether manifest data for the sled is stored on the compute device; and upon determining that the manifest data is not stored on the compute device, sending a query to the sled requesting the manifest data.

Example 78 includes the subject matter of any of Examples 68-77, and further including storing the manifest data and an identifier associated with the sled on the compute device.

Example 79 includes the subject matter of any of Examples 68-78, and wherein composing the node from the selected sleds comprises recording the node comprising the selected sleds in a sled configuration stored on the compute device.

Example 80 includes the subject matter of any of Examples 68-79, and further including determining one or more resource requirements of the workload.

Example 81 includes the subject matter of any of Examples 68-80, and wherein the selected one or more of the plurality of sleds satisfies resource requirements for the workload.

Example 82 includes one or more machine-readable storage media comprising a plurality of instructions stored thereon that, in response to being executed, cause a compute device to perform the method of any of Examples 68-81.

Example 83 includes a compute device comprising means for performing the method of any of Examples 68-81.

Example 84 includes a compute device comprising a compute engine to perform the method of any of Examples 68-81.

Example 85 includes a compute device comprising network communicator circuitry to receive a request to compose a node from a plurality of sleds, wherein the node is to process a workload, and resource manager circuitry to select, as a function of manifest data associated with each of the plurality of sleds, one or more of the plurality of sleds to include in the composed node, and compose the node from the selected sleds in response to the request.

Example 86 includes the subject matter of Example 85, and wherein the manifest data associated with each of the plurality of sleds is indicative of one or more characteristics of the sled.

Example 87 includes the subject matter of any of Examples 85 and 86, and wherein the manifest data includes at least one hardware manifest, firmware manifest, configuration manifest, or health manifest.

Example 88 includes the subject matter of any of Examples 85-87, and wherein the resource manager circuitry is further to generate manifest data for the composed node, wherein the generated manifest data includes manifest data associated with each sled of the composed node.

Example 89 includes the subject matter of any of Examples 85-88, and wherein the network communicatory circuitry is further to receive an update to manifest data associated with one of the sleds of the composed node, and wherein the resource manager circuitry is further to modify the generated manifest data based on the received update.

Example 90 includes the subject matter of any of Examples 85-89, and wherein the update to the manifest data associated with one of the sleds of the composed node includes an identifier associated with the one of the sleds.

Example 91 includes the subject matter of any of Examples 85-90, and wherein the resource manager circuitry is further to modify manifest data stored on the compute device with the update based on the identifier.

Example 92 includes the subject matter of any of Examples 85-91, and wherein the update is an indication of a change to one or more characteristics of the one of the sleds.

Example 93 includes the subject matter of any of Examples 85-92, and wherein the change is one of an increase in resources of the one of the sleds or a decrease in resources of the one or the sleds.

Example 94 includes the subject matter of any of Examples 85-93, and wherein the resource manager circuitry is further to, for each sled, determine whether manifest data for the sled is stored on the compute device; and wherein the network communicator circuitry is further to, for each sled, upon a determination that the manifest data is not stored on the compute device, send a query to the sled requesting the manifest data.

Example 95 includes the subject matter of any of Examples 85-94, and wherein the resource manager circuitry is further to store the manifest data and an identifier associated with the sled on the compute device.

Example 96 includes the subject matter of any of Examples 85-95, and wherein to compose the node from the selected sleds comprises record the node comprising the selected sleds in a sled configuration stored on the compute device.

Example 97 includes the subject matter of any of Examples 85-96, and wherein the resource manager circuitry is further to determine one or more resource requirements of the workload.

Example 98 includes the subject matter of any of Examples 85-97, and wherein the selected one or more of the plurality of sleds satisfies resource requirements for the workload.

Example 99 includes a compute device comprising circuitry for receiving, by a compute device, a request to compose a node from a plurality of sleds, wherein the node is to process a workload; means for selecting, as a function of manifest data associated with each of the plurality of sleds, one or more of the plurality of sleds to include in the composed node; and means for composing the node from the selected sleds in response to the request.

Example 100 includes the subject matter of Example 99, and wherein the manifest data associated with each of the plurality of sleds is indicative of one or more characteristics of the sled.

Example 101 includes the subject matter of any of Examples 99 and 100, and wherein the manifest data includes at least one hardware manifest, firmware manifest, configuration manifest, or health manifest.

Example 102 includes the subject matter of any of Examples 99-101, and further including means for generating manifest data for the composed node, wherein the generated manifest data includes manifest data associated with each sled of the composed node.

Example 103 includes the subject matter of any of Examples 99-102, and further including circuitry for receiving an update to manifest data associated with one of the sleds of the composed node; and means for modifying the generated manifest data based on the received update.

Example 104 includes the subject matter of any of Examples 99-103, and wherein the update to the manifest data associated with one of the sleds of the composed node includes an identifier associated with the one of the sleds.

Example 105 includes the subject matter of any of Examples 99-104, and further including means for modifying manifest data stored on the compute device with the update based on the identifier.

Example 106 includes the subject matter of any of Examples 99-105, and wherein the update is an indication of a change to one or more characteristics of the one of the sleds.

Example 107 includes the subject matter of any of Examples 99-106, and wherein the change is one of an increase in resources of the one of the sleds or a decrease in resources of the one or the sleds.

Example 108 includes the subject matter of any of Examples 99-107, and further including, for each sled means for determining whether manifest data for the sled is stored on the compute device; and circuitry for, upon determining that the manifest data is not stored on the compute device, sending a query to the sled requesting the manifest data.

Example 109 includes the subject matter of any of Examples 99-108, and further including means for storing the manifest data and an identifier associated with the sled on the compute device.

Example 110 includes the subject matter of any of Examples 99-109, and wherein composing the node from the selected sleds comprises means for recording the node comprising the selected sleds in a sled configuration stored on the compute device.

Example 111 includes the subject matter of any of Examples 99-110, and further including means for determining one or more resource requirements of the workload.

Example 112 includes the subject matter of any of Examples 99-111, and wherein the selected one or more of the plurality of sleds satisfies resource requirements for the workload.

The invention claimed is:

1. An apparatus, comprising:
a compute circuitry to:
generate manifest data indicative of one or more characteristics of multiple devices coupled to a circuit board, wherein the manifest data comprises configuration information indicative of firmware configurations of individual devices of the multiple devices and wherein the configuration information indicative of firmware configurations of individual devices of the multiple devices is to indicate one or more of: a BIOS version, baseboard management controller (BMC) firmware version, DIMM firmware version, and/or solid state drive (SSD) firmware version;
associate an identifier with the manifest data, wherein the identifier identifies the apparatus from among a plurality of apparatuses;
send the manifest data and the associated identifier to an orchestrator server;
detect a change in at least one or more characteristics of at least one device among the multiple devices;
update the manifest data based on the detected change, wherein the update specifies the detected change in the one or more characteristics of the at least one device; and
send the update of the manifest data to the orchestrator server.

2. The apparatus of claim 1, wherein to update the manifest data comprises to:
determine which of the manifest data to update based on the change; and
modify the manifest data based on the change.

3. The apparatus of claim 1, wherein the change is at least one of an addition of a first resource or a removal of a second resource.

4. The apparatus of claim 1, wherein the update sent to the orchestrator server comprises an indication of the change to the manifest data.

5. The apparatus of claim 1, wherein the manifest data includes at least one hardware manifest, firmware manifest, configuration manifest, or health manifest.

6. The apparatus of claim 5, wherein the hardware manifest specifies at least one of a processor count, a processor model, dual in-line memory module (DIMM) types, population locations, capacity, or I/O devices.

7. The apparatus of claim 6, wherein the configuration manifest comprises at least one of an indication of whether an ability to operate a processor core as multiple virtual cores is enabled, a DIMM speed setting, a CPU core frequency, or a boot device order.

8. The apparatus of claim 6, wherein to generate the manifest data indicative of the one or more characteristics of multiple devices coupled to a circuit board comprises to:
determine present hardware resources and firmware resources;
determine a configuration of the multiple devices;
determine a health of the hardware resources; and
create the hardware manifest based on the present hardware resources, the firmware manifest based on the present firmware resources, the configuration manifest based on the determined configuration of the multiple devices, and the health manifest based on the health of the hardware resources.

9. The apparatus of claim 6, wherein to associate the identifier with the manifest data comprises to:
determine a first identifier for the hardware manifest, a second identifier for the firmware manifest, and a third identifier for the configuration manifest; and
tag the first identifier to the hardware manifest, the second identifier to the firmware manifest, and the third identifier to the configuration manifest.

10. The apparatus of claim 1, wherein to send the manifest data and the associated identifier comprises to send the manifest data and the associated identifier in response to a request from the orchestrator server for the manifest data.

11. The apparatus of claim 1, wherein a node comprises at least the apparatus, wherein the node is composed based, in part, on the manifest data and wherein the compute circuitry is further to generate the manifest data for a composed node.

12. One or more non-transitory machine-readable storage media comprising a plurality of instructions stored thereon that, in response to being executed, cause one or more devices to:
generate manifest data indicative of one or more characteristics of multiple devices of a system, wherein the manifest data comprises configuration information indicative of a firmware utilized by individual devices of the multiple devices and wherein the configuration information indicative of a firmware utilized by individual devices of the multiple devices specifies one or more of: a BIOS version, baseboard management controller (BMC) firmware version, DIMM firmware version, and/or solid state drive (SSD) firmware version;
associate an identifier with the manifest data, wherein the identifier identifies the system from among a plurality of systems;
send the manifest data and the associated identifier to an orchestrator server;
detect a change in at least one or more of the characteristics of the system;
update the manifest data based on the detected change, wherein the update specifies the detected change in the one or more characteristics of the system; and
send the update of the manifest data to the orchestrator server.

13. The one of more non-transitory machine-readable storage media of claim 12, wherein the update sent to the orchestrator server is an indication of the change to the manifest data.

14. The one of more non-transitory machine-readable storage media of claim 12, wherein the manifest data includes at least one hardware manifest, a firmware manifest, configuration manifest, or health manifest.

15. The one of more non-transitory machine-readable storage media of claim 14, wherein the hardware manifest specifies at least one of a processor count, a processor model, dual in-line memory module (DIMM) types, population locations, capacity, or I/O devices, wherein the firmware manifest specifies at least one of a BIOS version, baseboard management controller (BMC) version, DIMM firmware version, or solid state drive (SSD) version, and wherein the configuration manifest of the system comprises at least one of an indication of whether an ability to operate a processor core as multiple virtual cores is enabled, a DIMM speed setting, a CPU core frequency, or a boot device order.

16. The one of more non-transitory machine-readable storage media of claim 14, wherein to generate the manifest data indicative of the one or more characteristics of the system comprises to:
   determine hardware resources and firmware resources present in the system;
   determine a configuration of the system; and
   create the at least one hardware manifest based on the hardware resources present, the firmware manifest based on the firmware resources present, and the configuration manifest based on the determined configuration.

17. The one of more non-transitory machine-readable storage media of claim 14, wherein to associate the identifier with the manifest data comprises to:
   determine a first identifier for the hardware manifest, a second identifier for the firmware manifest, and a third identifier for the configuration manifest; and
   tag the first identifier to the hardware manifest, the second identifier to the firmware manifest, and the third identifier to the configuration manifest.

18. The one of more non-transitory machine-readable storage media of claim 12, wherein to send the manifest data and the associated identifier comprises to send the manifest data and the associated identifier in response to a request from the orchestrator server for the manifest data.

19. The one of more non-transitory machine-readable storage media of claim 18, wherein a node comprises at least the system, wherein the node is composed based, in part, on the manifest data.

20. A system comprising:
   one or more processors; and
   a memory to store a plurality of instructions, which, when executed by the one or more processors, causes at least one circuitry to:
   generate manifest data indicative of one or more characteristics of multiple devices in the system, wherein the manifest data comprises configuration information indicative of a firmware applied by individual devices of the multiple devices and wherein the configuration information indicative of a firmware applied by individual devices of the multiple devices specifies one or more of: a BIOS version, baseboard management controller (BMC) firmware version, DIMM firmware version, and/or solid state drive (SSD) firmware version;
   associate an identifier with the manifest data, wherein the identifier identifies the system from among a plurality of systems;
   send the manifest data and the associated identifier to an orchestrator server;
   detect a change in at least one or more of the characteristics of the system;
   update the manifest data based on the detected change, wherein the update specifies the detected change in the one or more characteristics of the system; and
   send the update of the manifest data to the orchestrator server.

21. A method comprising:
   generating, by circuitry, manifest data indicative of one or more characteristics of multiple devices coupled to a system, wherein the manifest data comprises configuration information indicative of a firmware applied by individual devices of the multiple devices and wherein the configuration information indicative of a firmware applied by individual devices of the multiple devices specifies one or more of: a BIOS version, baseboard management controller (BMC) firmware version, DIMM firmware version, and/or solid state drive (SSD) firmware version and wherein the system is one of a plurality of systems;
   associating, by the circuitry, an identifier with the manifest data, wherein the identifier identifies the system from among the plurality of systems;
   sending, by the circuitry, the manifest data and the associated identifier to an orchestrator server;
   detecting, by the circuitry, a change in at least one of hardware resources, firmware resources, or the configuration of the system;
   generating, by the circuitry, an update of the manifest data based on the detected change, wherein the update specifies the detected change in the at least one of the hardware resources, firmware resources, or the configuration of the system; and
   sending, by the circuitry, the update of the manifest data to the orchestrator server.

22. The method of claim 21, wherein sending the manifest data and the associated identifier comprises sending the manifest data and the associated identifier in response to a request from the orchestrator server for the manifest data.

23. The method of claim 21, wherein a node comprises at least the system, wherein the node is composed based, in part, on the manifest data.

24. The method of claim 21, wherein generating the manifest data indicative of the one or more characteristics of the system comprises:
   determining hardware resources and firmware resources present in the system;
   determining a configuration of the system; and
   creating a hardware manifest based on the hardware resources present, a firmware manifest based on the firmware resources present, and a configuration manifest based on the determined configuration.

* * * * *